United States Patent [19]

Sugimoto et al.

[11] Patent Number: 4,969,046
[45] Date of Patent: Nov. 6, 1990

[54] TELEVISION MONITOR SYSTEM

[75] Inventors: Kouichi Sugimoto, Tokyo; Nobuyuki Kurosawa; Yoshitomo Ueno, both of Kanagawa, all of Japan

[73] Assignee: Sony Corporation, Tokyo, Japan

[21] Appl. No.: 358,647

[22] Filed: May 30, 1989

[30] Foreign Application Priority Data

Jun. 3, 1988 [JP] Japan .................................. 63-137067
Jun. 3, 1988 [JP] Japan .................................. 63-137068
Jun. 20, 1988 [JP] Japan .................................. 63-151804

[51] Int. Cl.$^5$ .............................................. H04N 5/64
[52] U.S. Cl. ..................................... 358/254; 358/255; 358/229
[58] Field of Search ...................... 358/254, 1, 229, 83, 358/245, 247, 249, 252, 255; 455/347, 348, 349, 351

[56] References Cited

U.S. PATENT DOCUMENTS 4,612,583 9/1986 Ayervais ............................... 358/255

FOREIGN PATENT DOCUMENTS 0059076 3/1988 Japan .

OTHER PUBLICATIONS

Sync. Publication Spring 1989.

Primary Examiner—Howard W. Britton
Assistant Examiner—Michael H. Lee
Attorney, Agent, or Firm—Hill, Van Santen, Steadman & Simpson

[57] ABSTRACT

A modular television apparatus including a video display module, a tuner module, and a power supply module, the modules being releasably combinable in a variety of combinations. The tuner module is provided with a switch for controlling a supply of power supply voltage from the power supply module to the remaining modules. The tuner module has a casing including an elongated recess into which a telescopic antenna can be stored, the recess conforming to the shape of the antenna. Switches are disposed within the recess, some of the switches having an exposed surface that conforms to the contour of the recess. The video display module is provided with a circuit for controlling the supply of power to other circuits according to detection of input of audio/video signals to the display modules.

13 Claims, 25 Drawing Sheets

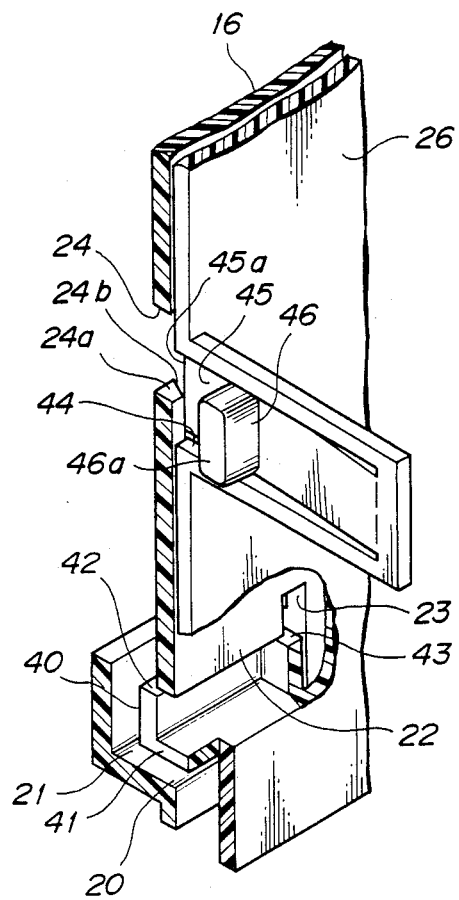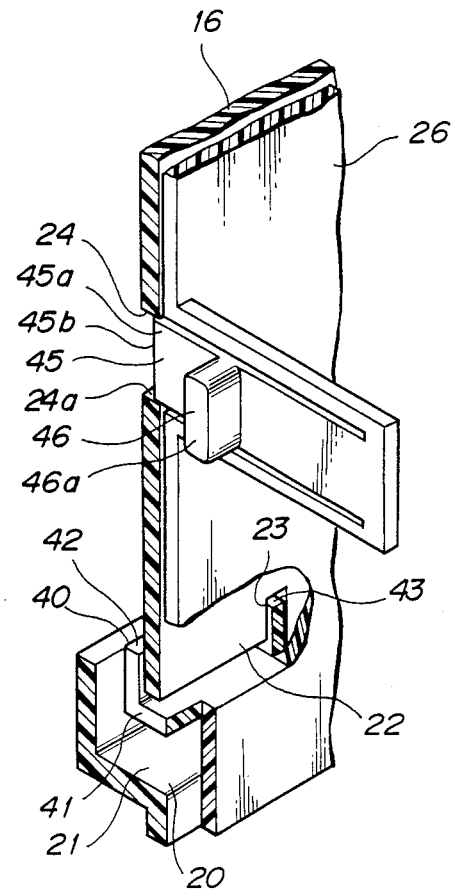
FIG.10(B)    FIG.10(C)

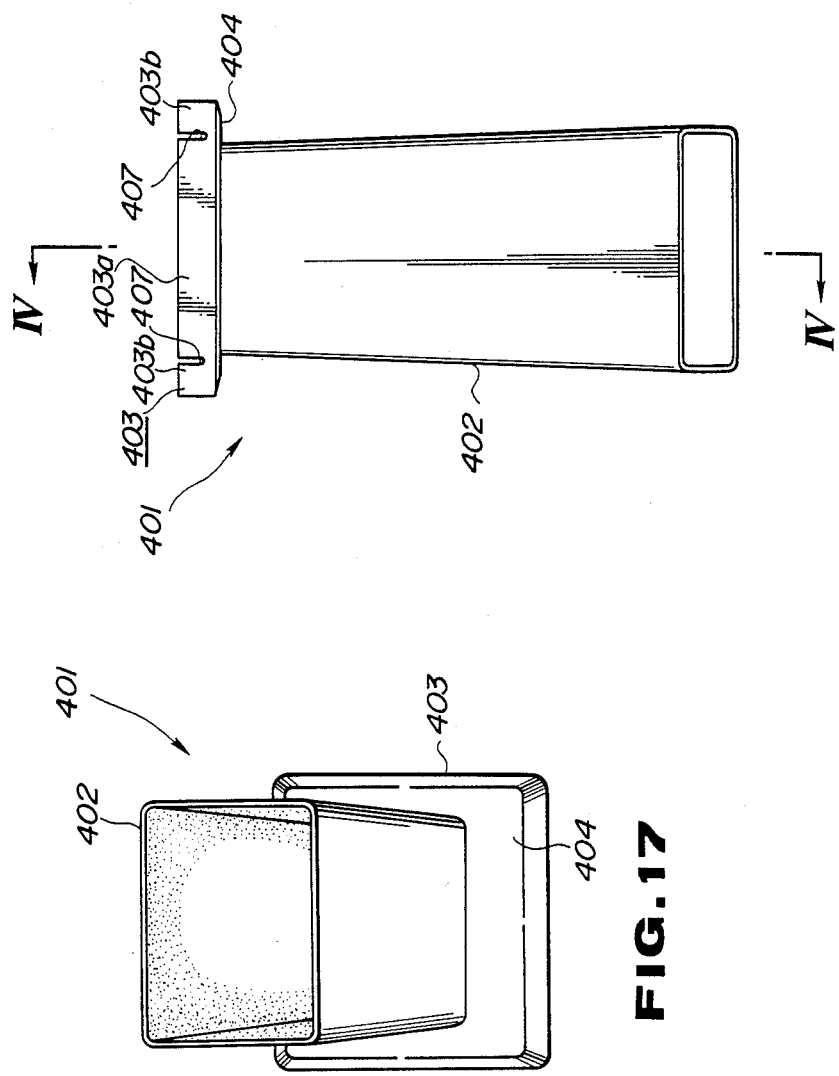

TELEVISION MONITOR SYSTEM

BACKGROUND OF THE INVENTION

The present invention generally relates to television monitoring apparatus. More specifically, the invention relates to television monitoring apparatus adapted for monitoring video cameras and/or video tape recorders.

A conventional television receivers generally constitutes a tuner unit, a display unit, and a power supply unit. These units generally are integrated into a single cabinet. Therefore, when a portable television receiver is used as a monitoring apparatus for a video camera and/or video tape recorder (VTR), the tuner unit is carried together with the display unit and the power supply unit, despite the lack of need for the tuner unit.

Additionally, when a television set is designed for receiving sound multiplexed broadcasts; radio broadcasts in addition to the television broadcasts; or television broadcasting in foreign countries, as well as for usual television broadcasts, the set must be equipped with a receiver having a television tuner for the sound multiplexed broadcasts, a television tuner with a radio tuner, or a foreign television tuner, respectively. In these situations, not only are the tuner units different, but the image display and power supply units are redundant. Having such redundant portions is wasteful because several television receivers must be provided, each uneconomically equipped with a different tuner unit.

Conventional television receivers suffer from further problems. One such prior art television set is illustrated in FIG. 1.

In the television receiver illustrated in FIG. 1, a telescopic antenna extends from a side surface h of a casing b. The telescopic antenna has cooperating telescopic elements d, e, and f. As illustrated, the side surface h from which the antenna extends provides an unused space.

If switches i (denoted by phantom lines) were installed in the vicinity of the telescopic antenna, the antenna were in its retracted and stored state and an operator were to operate the telescopic antenna so as to pivot the antenna laterally on an axis of a base g, an erroneous operation could often occur due to inadvertent touching by the operator's hand of one of the switches i. Therefore, switches conventionally are not installed on the side surface h against which the telescopic antenna is stored. Instead, switches are installed on another side surface. However, as the number of switches increases, the area needed to install the switches also increases. Hence, the other side surface area must be wide since the area of the side surface h to install the telescopic antenna cannot be used. Consequently, the manner in which the television receiver can be miniaturized is limited.

A conventional small sized television hood aa is illustrated in FIG. 2. In the television hood aa, a belt dd is employed to attach the television receiver ff to the hood aa.

It can be troublesome to attach the hood aa to the receiver ff because the tightness of the belt about the receiver ff determines the favorable attachment of the hood aa to the receiver ff. Many times the belt is not sufficiently tightened about the receiver ff.

When the hood aa is attached to the receiver ff, the receiver ff often becomes unstable and/or one of the straps of the belt dd can become loose. This is due in part to the gradual compression of a foam layer on a flange cc of the hood aa.

Because a large part of a front surface of the receiver ff includes a display screen gg, various switches and terminals are located on side surfaces of an outer frame of the receiver ff. Consequently, the switches and terminals are often covered over by the straps of the belt dd. Accordingly, depending on the position of the belt dd, an operator of the receiver ff often cannot access the switches and terminals of the receiver ff.

SUMMARY OF THE INVENTION

The present invention provides a modularized television monitoring apparatus wherein different component parts of the apparatus can be combined or omitted, as needed.

To this end, the present invention provides a television monitoring apparatus having combinable and/or separable portions including a video display module, a video and/or audio output module (small-sized television tuner module), and a power supply module. The tuner module is provided with a first means for controlling a supply of power from the power supply module to the video display module. Furthermore, the tuner module is provided with a second means for selectively enabling the supply of the power to a video and/or audio output circuit only when an input of a video and/or audio signal to the video display module is detected.

The first and second means make possible the use of the television monitoring apparatus as a television receiver, a video monitor, a television receiver with a radio monitor, and so on and so forth. Accordingly, the need to produce multiple diverse television sets, each with its own video image display and power supply can be avoided. Further, power consumption reduction can be achieved by inhibiting the supply of power to the video and/or audio output circuit unless the input of the video and/or audio signal to the video image display module is present.

In the tuner module of the present invention, the portions of the switches contacted by an operator of the television apparatus are located in a recessed channel into which the telescopic antenna is stored. The recess is provided so that the conventionally unused space of that side surface can be employed for the location of switches. Accordingly, utilization of the surface of the television monitoring apparatus is increased thereby enabling further miniaturization of the television monitoring apparatus.

Further, a hood for a television monitoring apparatus according to the present invention is provided with appropriate cut-outs along frame pieces, the cut-outs cooperating and registering with the location of the switches and terminals disclosed on a front portion of a side surface of the television monitoring apparatus. A frame body of the hood serves as a small-sized television receiver mounting portion of the hood.

Accordingly, an advantage of the present invention is the modularization of a television monitoring apparatus.

Another advantage of the invention is the provision of a hood member that attaches to the frame of the television monitoring apparatus in a stable manner without a belt which overlays the switches to thereby cause unstable operation of the television and/or impede access to the switches.

These and other advantages will become more apparent by reference to the detailed description of the presently preferred embodiments, as well as the drawings.

BRIEF DESCRIPTION OF THE DRAWINGS

In the drawings:

FIGS. 10a-10c are perspective views illustrating a series of steps for combining related modules of the television monitoring apparatus;

FIG. 17 is a front view of a hood of a first preferred embodiment of a television monitoring apparatus according to the present invention;

FIG. 18 is a top view of the hood illustrated in FIG. 17;

DETAILED DESCRIPTION OF THE PRESENTLY PREFERRED EMBODIMENTS

Figure 1:
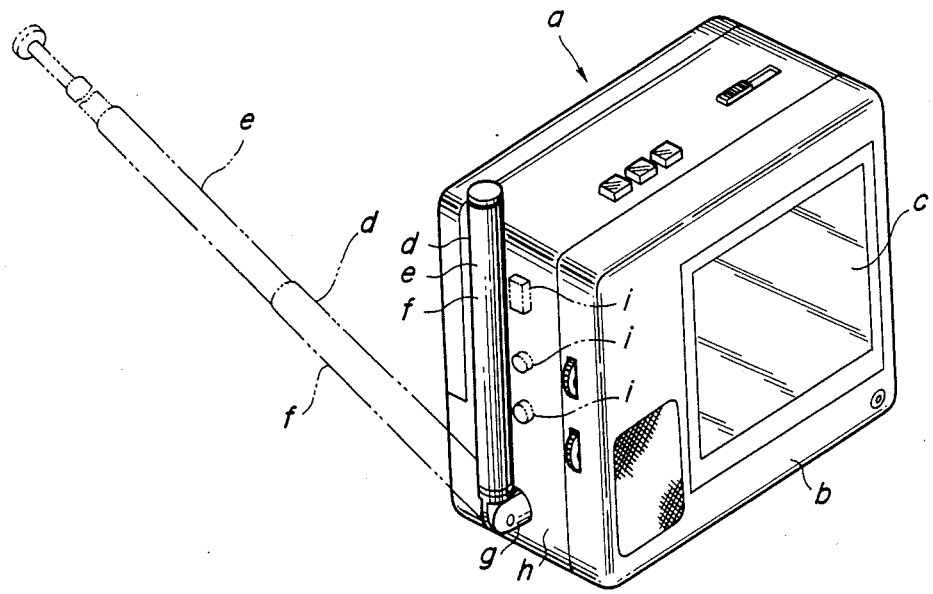
FIG. 1 is a perspective view of a conventional small-sized television set.
Figure 2:
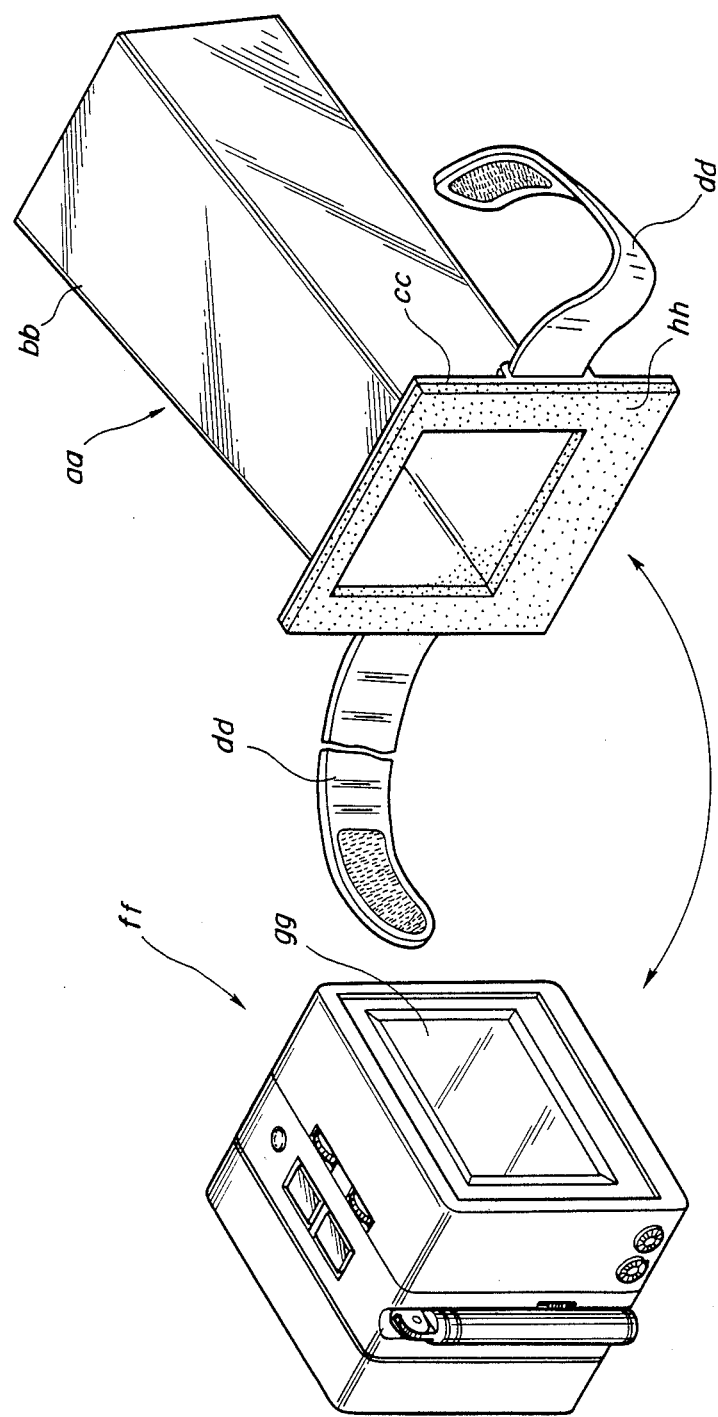
FIG. 2 is a perspective view of the conventional television set shown in FIG. 1 and a hood usually mounted on the television set of FIG. 1.

The present invention provides a modularized television monitoring apparatus including at least a video display module, a tuner module and a power supply module. A detailed description of the presently preferred embodiments follows.

The presently preferred embodiment of a television monitoring apparatus according to first principles of the invention is illustrated in FIGS. 3–16. For the most part, however, reference can be made to FIGS. 3 and 4, wherein the television monitoring apparatus 1 is illustrated in exploded perspective view.

The television monitoring apparatus 1 includes a video image display module 2, a tuner module 3, and a power supply module 4. It can be appreciated that, as illustrated, the modules 2, 3, and 4, are adapted to be mated together so as to comprise a single unit, i.e., the television monitoring apparatus 1. However, because the monitoring apparatus 1 is modularized, the modules 2, 3, and 4 can be combined in a variety of ways including all of the modules 2, 3, and 4 together, or at least the modules 2 and 4. When the modules 2, 3, and 4 are all coupled together, the combined apparatus can serve as a television receiver. When the video image display module 2 and the power supply module 4 only are combined, the combined apparatus can serve as a monitoring apparatus for a video camera, laser disc, video tape recorder, etc.

Figure 3:
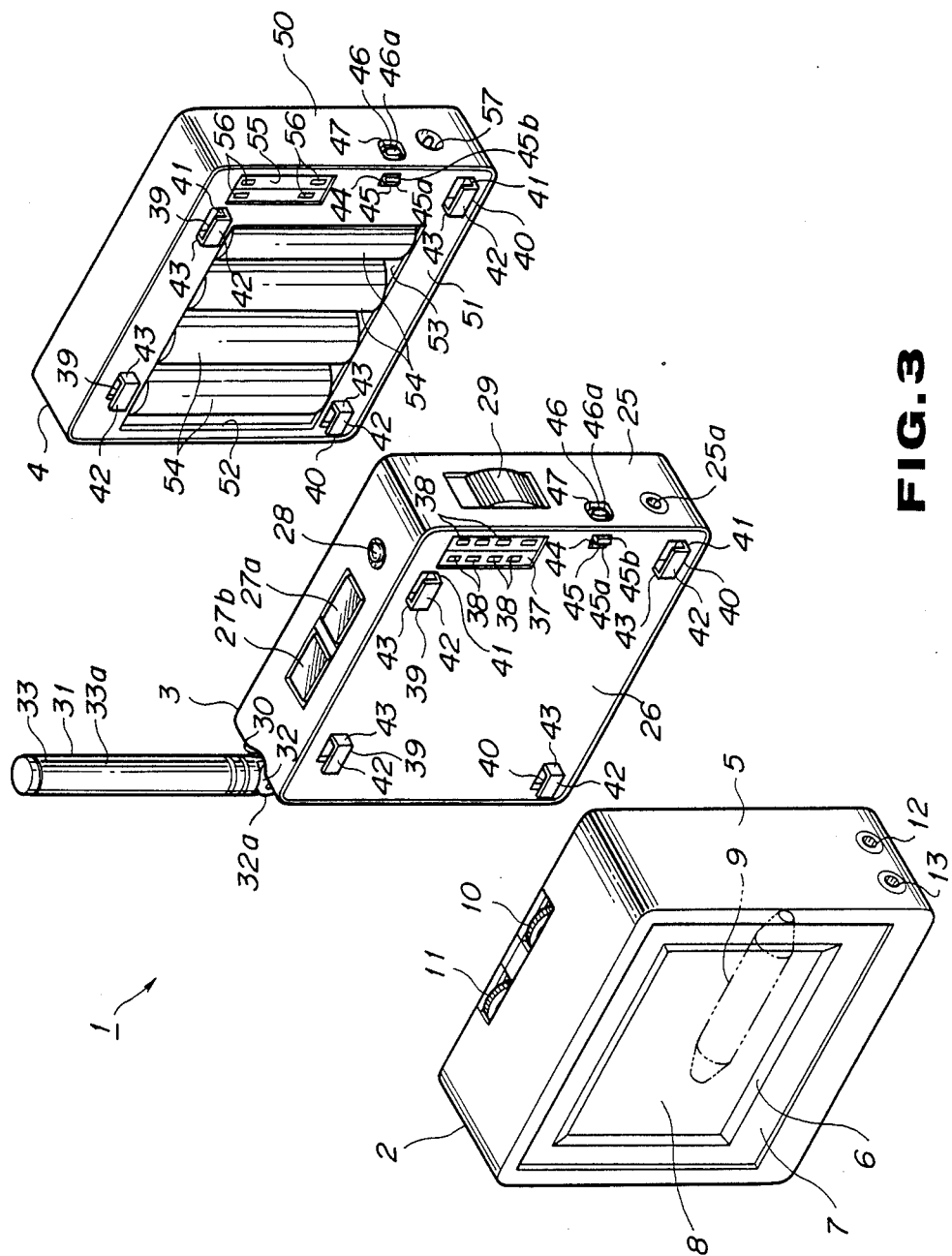
FIG. 3 is an exploded perspective view illustrating each module of a preferred embodiment of a television monitoring apparatus according to the present invention.
Figure 4:
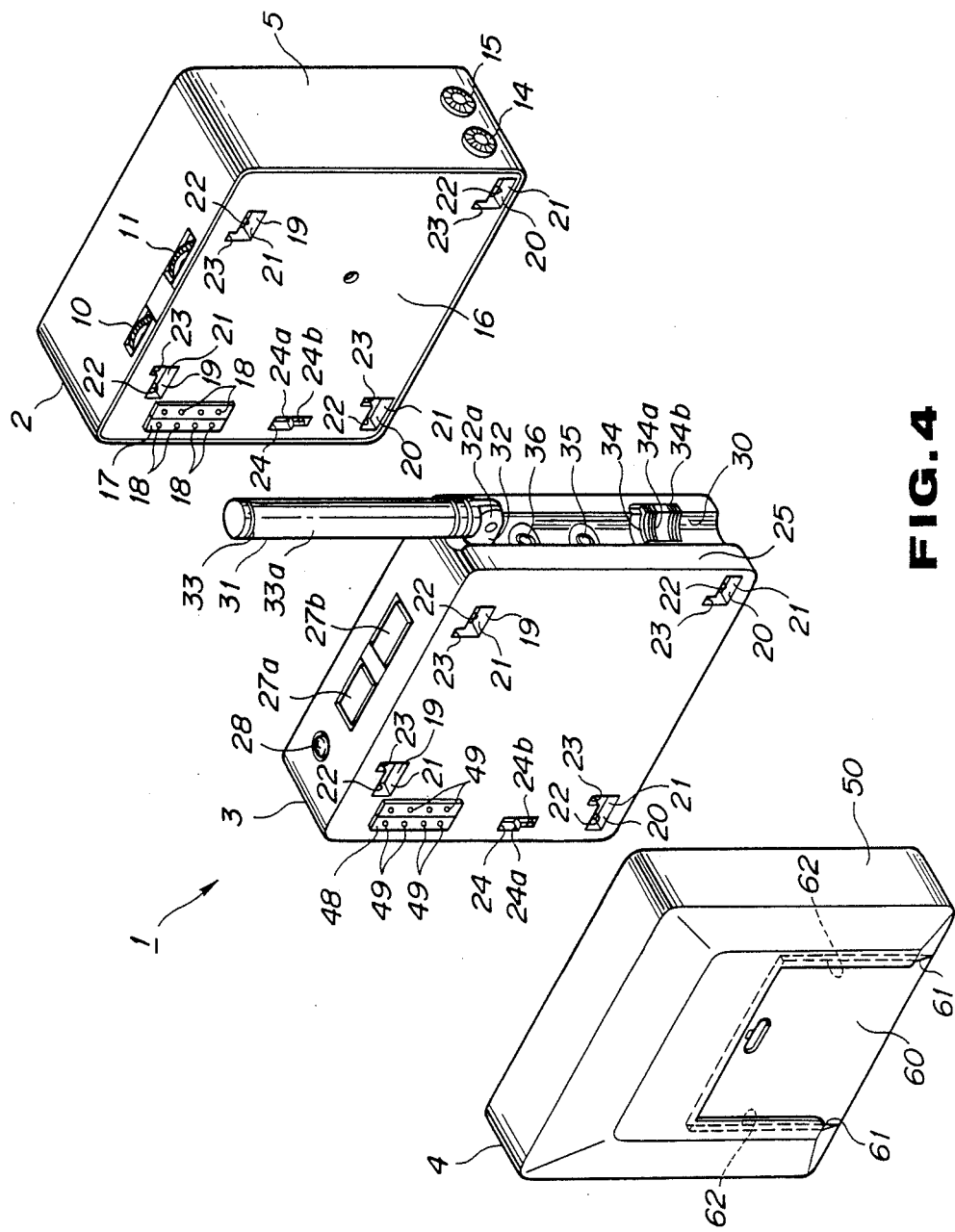
FIG. 4 is an exploded perspective view illustrating each module of the television monitoring apparatus of FIG. 3, but viewed from a different direction than that of FIG. 3.

As illustrated in FIGS. 3–7, 9, and 11, and most particularly in FIGS. 3 and 4, the video image display module 2 includes a rectangular box shaped casing 5 having a substantially rectangular shaped front surface and an opening at a rear surface. A wide window 6 is formed at the front surface. A transparent plate 7 overlies the window 6 at the front surface.

As is further illustrated, a liquid crystal display 8 is provided within the casing 5 so as to display images through the window 6. A back-lighting light source 9 is disposed on a rear surface of the liquid crystal display 8 so as to cooperate with the display 8 in the known manner. Drive circuits for driving the liquid crystal display 8 and back-lighting light source 9, other circuits, and switches disposed within the casing 5 are discussed further below.

The video display module 2 further includes adjusting dials for adjusting parameters of the displayed images as well as the volume of any sound. To this end, the video display module 2 includes adjusting dials 10 and 11 for adjusting the brightness of the displayed images and the volume, respectively. The dials 10 and 11 are disposed on an upper surface of the casing 5.

As illustrated most clearly in FIG. 3, located on a right side surface of the casing 5 are an audio visual signal input jack 12 and an earphone jack 13.

As illustrated in FIG. 4, further adjusting dials 14 and 15 for adjusting the contrast and color, respectively, of the displayed video images are located on a left side surface of the casing 5.

A rear lid 16 is included to cover the opening at the rear side of the display module 2. The rear lid member 16 is mounted on the rear side surface of the casing 5.

As illustrated, the rear lid member 16 includes a variety of elements employed for coupling the video display module 2 to the tuner module 3 or the power supply module 4. To this end, the rear lid member 16 includes a connector member 17, having a plurality of parallel connector pins 18, disposed on a left upper portion of the rear lid 16. Further, upper linkage portions 19 and lower linkage portions 20 are formed in the rear lid member 16.

The upper linkage portions 19 are formed on upper left and right end portions of the rear lid member 16, and are spaced apart from each other in rightward and leftward directions. Similarly, the lower linkage portions 20 are formed on lower end portions of the rear lid 16, and are spaced apart from each other in the rightward and leftward directions, albeit by a greater amount than the upper linkage portions 19. The linkage portions 19 and 20 are employed to assure secured coupling of the video display module 2 to one of the other modules.

As illustrated, each linkage portion 19 and 20 includes a recessed portion 21, a tab member 22 for covering upper portions of the recessed portions 21, and slits 23 formed adjacent to side portions of the tab members 22.

The rear lid member 16 also includes a lock hole 24. The lock hole 24 is formed on a portion of the rear lid member 16 located at a position slightly lower than a center of the lid member 16 and along a portion adjacent to a side edge of the lid member 16. A right edge of the lock hole 24 is recessed so that an upper side lock edge 24a is formed. A lower elongated portion 24b of the lock hole 24 is formed at a right side edge of the upper lock edge 24a. The functions of these elements will become more apparent below.

The tuner module 3 is designed to function as a television tuner for domestic use. A casing 25 for the tuner module 3 is formed substantially in a rectangular box shape having a rectangular opening at a front surface thereof. The front opening is covered by a front lid 26, illustrated most clearly in FIG. 3.

The tuner module 3 is equipped with channel selection buttons 24a and 24b that are installed in an upper surface of the casing 25. The channel selection button 27a serves as a button for selecting a channel number in a direction in which the selected channel number is increased whenever the button is pressed. The channel selection button 24b serves as a button for selecting the channel number in which the selected channel number is decreased whenever the button is pressed.

A channel call selection button 28 is located on the upper surface adjacent to the channel selection buttons 24a and 24b. Every time the selection button 28 is depressed, the tuner module 3 switches between a mode in which a channel number received on a display screen of the liquid crystal display 8 is displayed to a mode in which the channel number is not displayed.

The tuner module 3 also includes a slide type power switch 29. The power switch 29 is installed on a right side surface of the casing 25. When the power switch 29 is moved in an upward direction, the power supply of the tuner module 3 is switched on. When the power switch 29 is moved in a downward direction, the power supply is switched off.

As is illustrated in FIG. 4, the tuner module 3 includes an elongated recess 30 formed along a central portion of a right side surface of the casing 25. The elongated recess extends from an upper end to a lower end of the side. Most notably, the recess 30 has an arcuate cross-sectional shape. The recess 30 is especially adapted to receive therein a telescopic antenna 31 when the antenna 31 is in its stored position.

The telescopic antenna 31 has a base portion 32 which can extend in a lateral direction with respect to the casing 25. The base 32 is located in the proximity of the upper end of the right side surface of the casing 25. As illustrated, the telescopic antenna 31 is pivotally mounted on the base member 32 and, accordingly, is permitted to pivot on an axle contained within a ball portion 32a of the base member 32. Moreover, the base member 32 pivots about an axis and, accordingly, the base member 32 provides at least 2 degrees of freedom for positioning the antenna 31.

It can be appreciated that the base member ball portion 32a projects outward from the recess 30. The ball portion 32a is engaged by a base member 33a of the telescopic antenna 31.

An adjustment knob 34 of a sliding scan switch is positioned on the left side surface of the casing 25 within the recess 30. The knob 34 is movable along the axis of the recess 30. Moreover, the knob 34 is integrally formed of a portion 34a located within the recess 30 and a portion of 34b located on an adjacent portion of an edge of the recess 30. Portion 34a is of arcuate cross-section so as to conform to the curved surface of the recess 30.

It can be appreciated that when the antenna 31 is in its stored position within the recess 30, only the portion 34b of the knob 34 is exposed. Hence, the knob 34 can still be caused to move by means of pressing of the portion 34b. It is noted that when the knob 34 is located in the downward direction, all television channels can be selected by depressing the channel selection buttons 24a and 24b. In contrast, when the knob 34 is located in the upward position, only previously stored channels can be selected by means of depressing the channel selection buttons 24a and 24b.

An entry button 35 is also arranged within the recess 30 but is not exposed when the antenna 31 is stored within the recess 30. The button 35 is employed to store a channel number in memory. When the button 35 is depressed, a currently received channel is stored.

A "clear" button 36 is positioned in the recess 30 above the button 35 and also is not exposed when the antenna 31 is in the stored position. When the "clear" button 36 is depressed, the content of the channel information stored in memory is erased.

It can be appreciated that the above-described portion 34a of the knob 34 and the buttons 35 and 36 are positioned in the recess 30 so as not to be depressed by the antenna 31. Moreover, they do not impede the movement of the antenna 31 along the recess 30 when the antenna 31 is retracted and folded into the recess 30.

A connector 37 is located on a right upper hand portion of the front lid member 26 and is provided with a number of contacts 38. The connector 37 and contacts 38 thereof are adapted to contact the connector 17 and contacts 18 thereof when the tuner module 3 and display module 2 are coupled together.

Front lid member 26 also includes upper engagement projection members 39 and lower engagement projection members 40. The upper engagement projection members 39 are formed and positioned on the upper end portions of the front lid member 26 and are spaced apart from each other in the rightward and leftward directions. The lower engagement projection members 40 are formed and positioned on the lower end portions of the front lid member 26 and are spaced apart from each other in the rightward and the leftward directions. The distance between the lower engagement projection member 40 is the same as that between the lower linkage recess portions 20 formed on the video image display module 2, described above. Similarly, the spaced apart distance between the upper engagement projection members 39 is the same as that between the upper linkage recess portions 19, also formed on the video image display module 2 rear lid member 16.

Each engagement projection member 39 or 40 includes a projection element 41 that projects horizontally from the front lid member 26 in the forward direction. A vertically aligned member 42 is located at an end of the projection element 41. Another vertical member 43 is positioned at a side edge of the projection member 41, on the side that faces the center of the front lid member 26. It can be appreciated that these elements are integrally formed.

It can be appreciated that the engagement projection members 39 and 40 are adapted to cooperate with the linkage recesses 19 and 20. Accordingly, the projection members 39 and 40, as well as the recesses 19 and 20, serve to couple the modules 2 and 3 together.

An opening 44 is located in the front lid member 26 just inside the right-hand edge thereof. A lockpiece 45 has a rear end portion connected to the casing 25 and a flexible front end portion 45a that extends through the opening 44. The front end portion 45a is flexible in the left and right directions. Accordingly, the front end portion of 45a of the lockpiece 45 projects from the front lid member 26 through the recess 44. It can be appreciated that the front end portion 45a is biased in the rightward direction and, accordingly, normally rests against a right side of recess 44. A front end surface 45b of the front end portion 45a includes an oblique surface on the right side thereof.

As illustrated most clearly in FIG. 3, a depressible portion 46 projects from an opening 47 formed at right angles to the opening 44 but along the right-hand surface of the casing 25. The depressible portion 46 is connected to the lockpiece 45. It can be appreciated by depressing the end surface 46a of the depressible portion 46 causes the front end portion 45a of the lockpiece 45 to flex in the left and right directions.

It can further be appreciated that the lock member 45 is adapted to engage the recess 24 of the video display module 2. The cooperation of the lockpiece 45 and the lock recess 24 serves to secure the two modules together when they are coupled.

A rear surface of the tuner module 3 is formed with upper and lower linkage elements 19 and 20, respectively, and a lock recess 24 in the same manner as those formed on the rear surface 16 of the video image display module 2. Accordingly, further discussion of these elements is not included.

Although the tuner module 3 has been described as being a television tuner having a normal tuner for domestic television broadcasts, the tuner module 3 may have a tuner for sound multiplexed broadcasts, a tuner for foreign television broadcasts, a tuner for television broadcasts having a radio tuner, or a tuner corresponding to CATV (cable television). A user can purchase a desired tuner module to be used in combination with the video image display module 2 and the power supply module 4.

A connector member 48 is positioned on a right-hand upper portion of the rear surface of the casing 25. The connector member 48 includes a plurality of connector pins 49.

An antenna jack 25a is installed on a lower side of the right side surface of the casing 25 through which an external antenna can be connected.

The power supply module 4 will now be described. Primary reference should be made to FIGS. 3-7 and 9.

As illustrated, the power supply module 4 includes a casing 50 having a substantially box-shape with a rectangular front opening. A front lid member 51 engages and covers the front opening. A square-shaped opening 52 is formed in the lid member 51 through which a recess 53 for receiving batteries is exposed. The recess 53 is formed so as to accommodate four AA dry cells 54. A connector member 55 is installed on a right upper portion of the front lid member 51 and it is formed with a plurality of contacts 56. The connector member 55 is adapted to contact the connector 48 for transmitting electrical signals therebetween.

Figure 5:
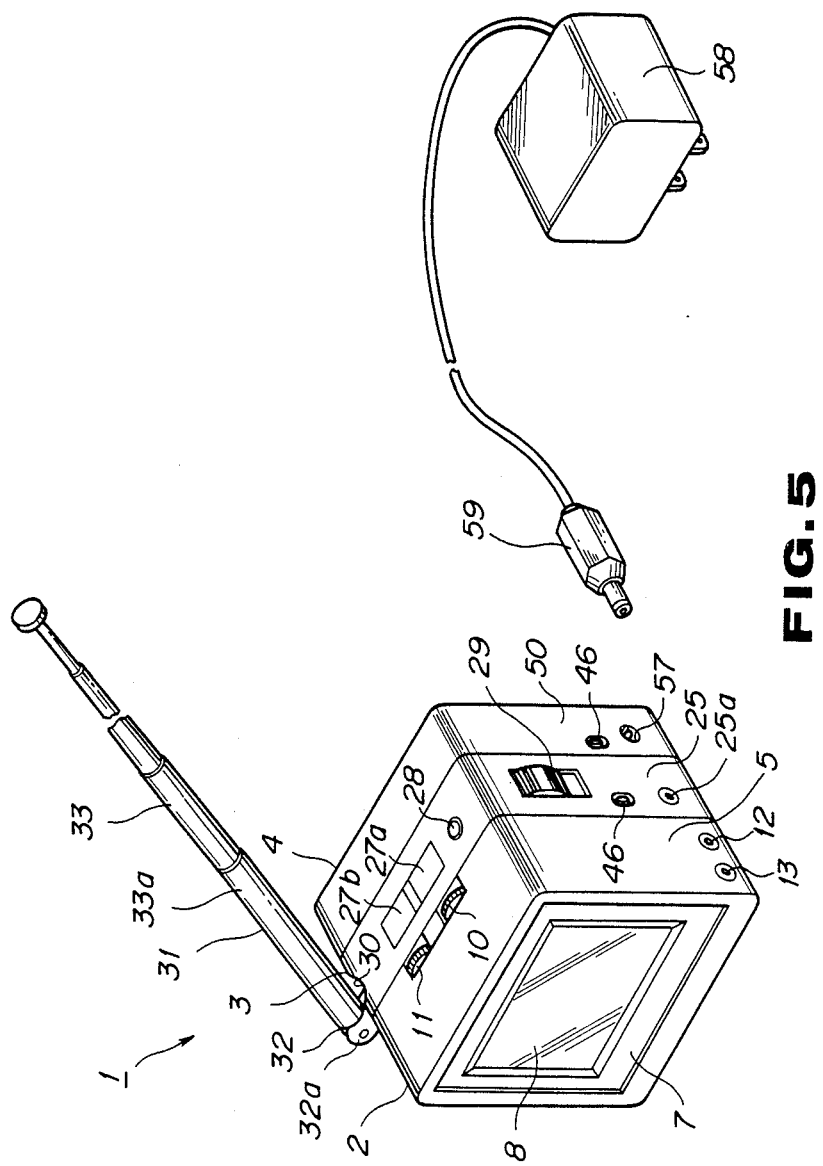
FIG. 5 is a perspective view of the television monitoring apparatus of FIG. 3 when the apparatus is used as a television receiver with each module combined.

A power supply input jack 57 is formed on a right side surface lower end portion of the casing 50. As best illustrated in FIG. 5, a male plug member 59 coupled to a transformer 58 is adapted to be received within the power supply input jack 57 so as to permit the supply of power from an AC outlet to the power supply module 4.

A shallow rectangular recess 60 is formed on a rear surface of the casing 50, the shallow recess 60 having an upper edge extending to a substantially central portion of the rear surface. The shallow recess 60 has an opening 61 at a lower end of the casing 50. A peripheral edge 62 of the recess 60 is formed so as to have a channel therein. These channels are adapted to engage therein a stand member to be described below.

The power supply module 4 includes engagement projection elements 39 and 40 and a lockpiece 45. The engagement projection elements 39 and 40 and lockpiece 45 are formed in the same way as those on the front surface of the television tuner module 3. Accordingly, further discussion of these elements is not warranted.

Figure 8A:
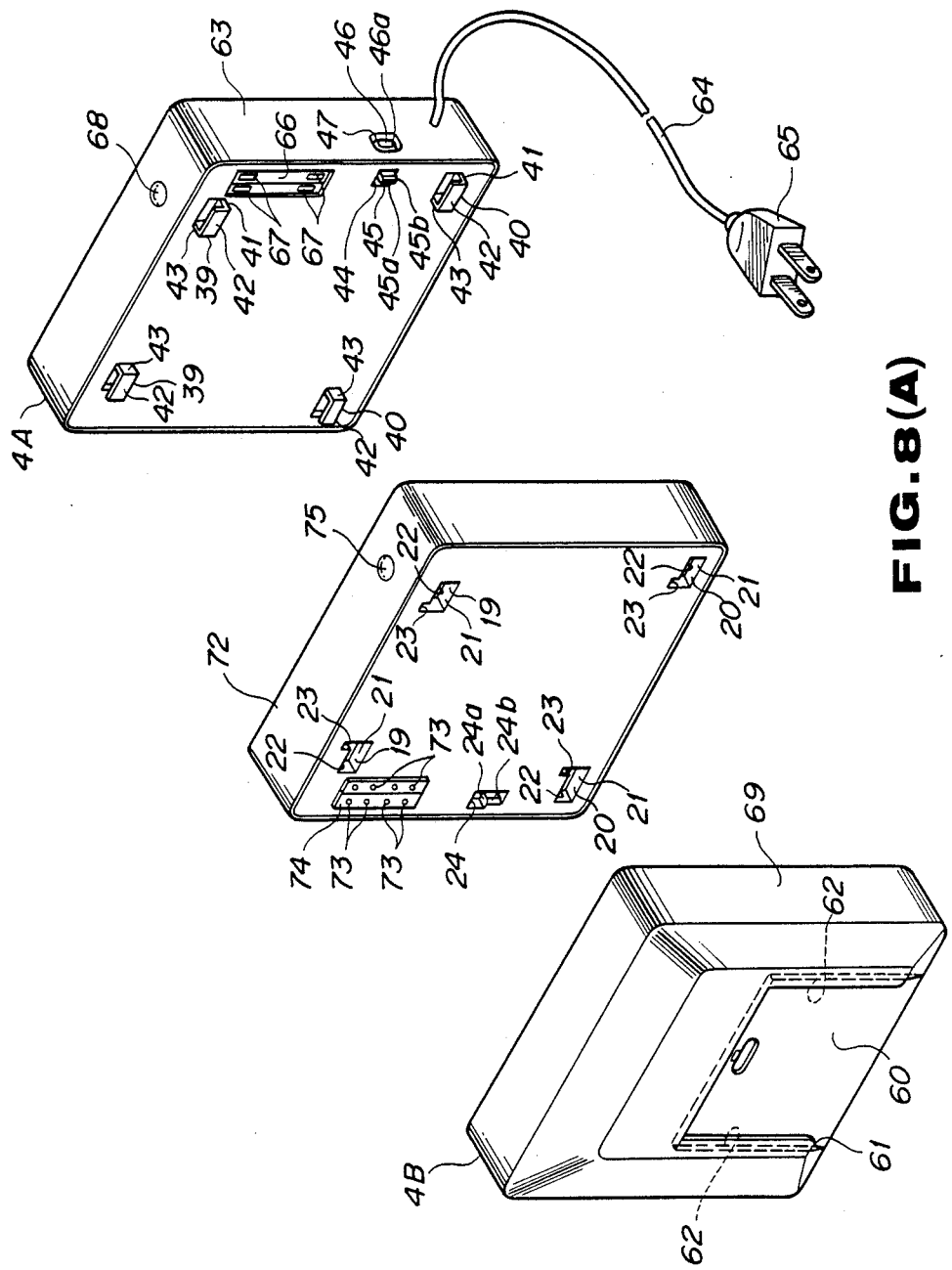
FIGS. 8a and 8b are perspective views of another example of a power supply module of a television monitoring apparatus according to further principles of the invention.
Figure 8B:
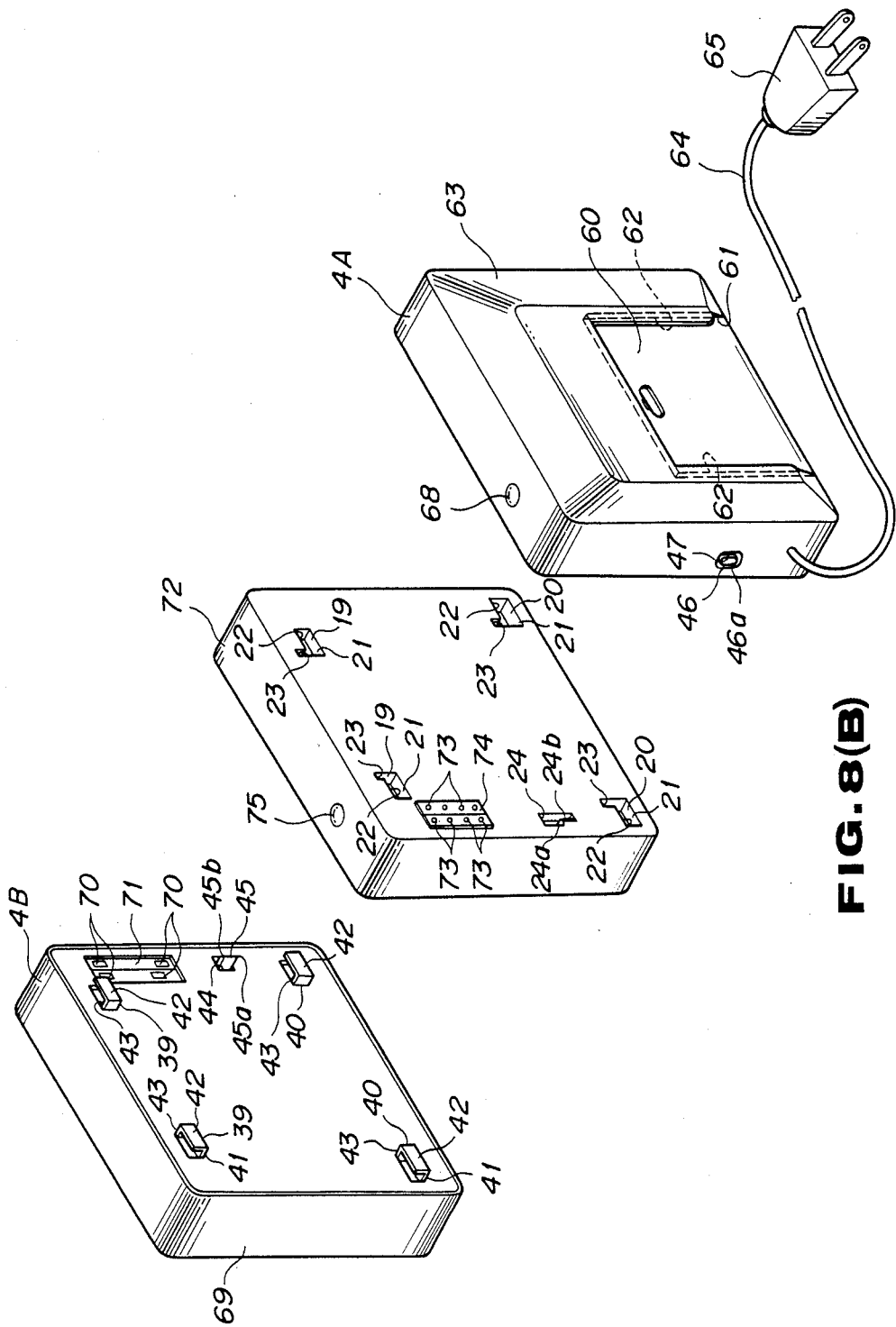
Figure 9:
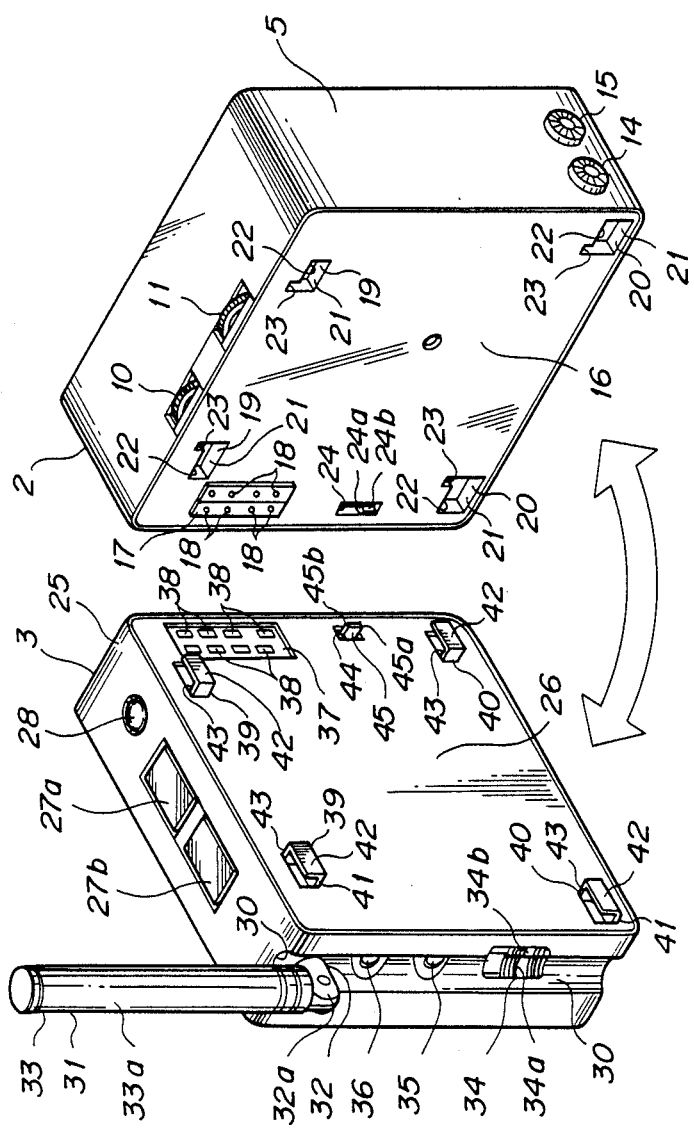
FIG. 9 is a perspective view of two modules of a monitoring apparatus embodying principles of the invention.

As illustrated in FIGS. 8(a) and 8(b), the power supply module 4 may be an AC adaptor type, a battery cell type, or a dry cell type. However, as illustrated, the power supply module 4 preferably includes a power supply module of an AC adaptor type in which an AC-DC converter, DC-DC converter, and other required circuits are installed within the casing 63. A power supply cord 64 with plug 65 is provided for connection to a commercial AC power supply socket.

As illustrated most clearly in FIG. 8(a), a connector member 66 is installed in a right-hand upper portion of the front surface of the casing 63 and is provided with a plurality of contacts 67. A connector member 66 is adapted to couple with a similar connector member to provide power therethrough.

A pilot light emitting diode (LED) 68 is provided in the upper surface of the casing 63. The LED 68 is used to indicate a power-on situation when the LED 68 emits light.

The engagement projection elements 39 and 40 and lockpiece 45 are installed in the same manner as those installed on the tuner module 3 and power supply module 4. A shallow recess 60 is formed on the rear surface of the casing 63 in the same manner as that formed on the power supply module 4. Accordingly, the AC adaptor module 4a can be used in the place of the power supply module 4.

A battery type power supply module 4b houses a rechargeable type battery, for example, a nickel cadmium (Ni-Cd) battery within a casing 69. A connector member 71 is formed having a plurality of contacts 70 on a right upper portion of a front surface of the casing 69. The front surface of the casing 69 is provided with similar engagement projection elements 39 and 40 and lockpiece 45. Accordingly, the rechargeable type power supply module 4b can be used in the place of the power supply modules 4 and 4a.

It can be appreciated that the AC adaptor module 4a can be used to charge the rechargeable type power supply module 4b. In this situation, a charging adaptor member 72 is employed.

As illustrated, the recharging adaptor member 72 includes a thin box-shaped casing and a connector member 74. The connector member 74 includes a plurality of appropriate connector pins 73. The connector members 74 and connector pins 73 are connected together and coupled with those of the AC adaptor module 4a or rechargeable type power supply module 4b.

A pilot LED 75 is installed on the upper surface of the recharging adaptor member 72. The LED 75 is used to indicate that the adaptor is recharging.

Both front and rear surfaces of the charging adaptor 72 are formed with linkage portions 19 and 20 and lock hole 24 in the same way as those installed on the rear surface of the tuner module 3. According, they are not discussed further.

It can be appreciated that, if the engagement projections 39 and 40 of the AC adaptor 4A are combined with the linkage portions 19 and 20 of the charging adaptor 72, and the engagement projections 39 and 40 of the rechargeable type power supply module 4B are combined with the linkage portions 19 and 20 of the charging adaptor 72, the contacts 67 of the connector 66 of the AC adaptor 4A, will be connected to the contacts 70 of the connector 71 of the rechargeable-type power supply module 4B via the connectors 74, of the charging adaptor 72. When a plug 65 of the AC adaptor 4A is inserted into a socket of a commercial AC power supply, the electric charging of the rechargeable-type power supply module can be carried out.

Examples of operation of the television monitoring apparatus 1 are now discussed.

When the television monitoring apparatus 1 is used as a television receiver, the television tuner module 3 is connected to the rear side of the video image display module 2 and the power supply module 4 is connected to the rear side of the tuner module 3. The connection of the tuner module 3 to the rear side of the video image display module 2 is discussed below.

Figure 10A:
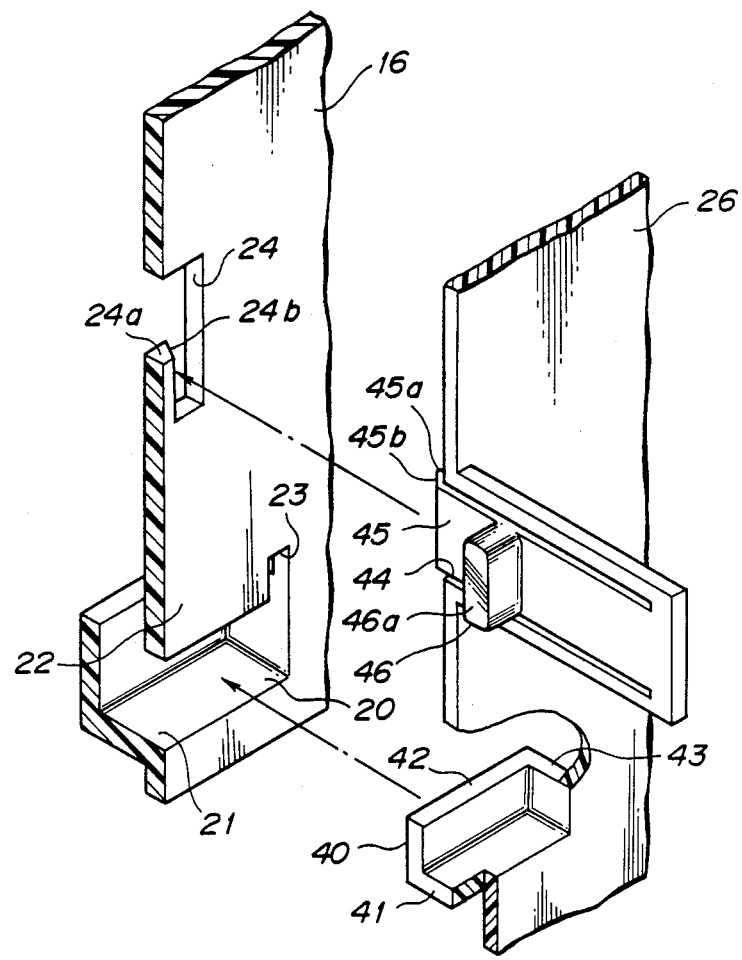

As shown in FIGS. 10(A) and 10(B), the engagement projections 39 formed on the front surface of the television tuner module 3 are inserted into a lower half portion of the recess portions 19 formed on the rear surface of the video image display module 2. The engagement projections 40 of the tuner module 3 are inserted into a lower half portion of the recess portions 21 of the linkage portions 20 of the image display module 2.

At this time, the oblique surface 45b of the lock piece 45 of the tuner module 3 contacts a corresponding oblique surface 24b of the edge of the lock hole 24 in the video image display module 2. When the contact becomes close and tight, a displacement force toward the let side is received by sliding both oblique surfaces 45a, 24b. This causes the lock piece 45 to flex so that the tip end portion 45a moves in the leftward direction. The tip end 45a of the lock piece 45 is then inserted into the lower half portion of the lock hole 24 as illustrated in FIG. 10(B).

After obtaining this last state, the tuner module 3 is moved slightly in the upward direction with respect to the video image display module 2. At this time, the engagement pieces 42 of the engagement projections 39 and 40 are inserted into front sides of the cover pieces 22 of the linkage portions 19 and 20 and, simultaneously, the engagement strips 43 of the engagement projections 39 and 40 are engaged with slits 23 of the linkage portions 19 and 20.

The tuner module 3 is moved upward with respect to the video image display module 2 until the projection pieces 41 of the engagement projections 39 and 40 contact the lower ends of the cover pieces 22 of the linkage portions 19 and 20. Thus, as illustrated in FIG. 10(C), the engagement projections 39 and 40 of the tuner module 3 tightly link with the linkage portions 19 and 20 of the video image display module 3.

At this time, the front end 45a of the lock piece 45 of the tuner module 3 is moved upward within the lock hole 24 of the video image display module 2. When the engagement projections 39 and 40 of the tuner module 3 are linked with the linkage portions 9 and 20 of the video image display module 2, the front end 45a of the lock piece 45 is displaced upward with respect to the lock edge 24a of the lock hole 24. Hence, since the front end 45a is returned to the rightward direction due to the elasticity of the lock piece 45, and its lower end is brought into abutment to the lock edge 24a as illustrated in FIG. 10(c). As the tuner module 3 is moved downward with respect to the video image display module 2, a lower end of the front end 45a of the lock piece 45 engages the lock edge 24a of the lock hole 24 of the video image display module 2 so as to prevent the further movement in the downward direction. This causes tight locking linkage between the engagement projections 39 and 40 of the tuner module 3 and linkage portions 19 and 20 of the video image display module 2.

It can be appreciated that when the tuner module 3 is combined with the video image display module 2, the connector pins 18 of the connector 17 of the video image display module 2 are connected to the contacts 38 of the connector 37 of the tuner module 3.

The engagement projections 39 and 40 installed on the front surface of the power supply module 4 are linked with the linkage portions 19 and 20 formed on the rear surface of the tuner module 3 in a similar manner. Thus, the connector pins 49 of the connector 48 of the tuner module 3 connect to the contacts 56 of the connector 55 of the power supply module 4.

When the video image display module 2, tuner module 3, and power supply module 4 are connected together, they can integrally be used as a television receiver. In place of the power supply module 4, the AC adaptor 4A or rechargeable-type power supply module 4B can alternatively be used.

When the power supply switch 29 is moved upward to apply power to the television apparatus 1, the power supply voltage is supplied to a tuner of the tuner module 3 and the video image display module 2 from the power supply module 4. Therefore, since the video and/or audio signal is transmitted from the tuner of the tuner module 3 to the video image display module 2, the power supply voltage is supplied to a video and/or audio output circuit of the video image display module 2 and a video image is displayed on the liquid crystal display (LCD) 8. In addition, since an electrical audio signal is made available at the ear phone jack 13, a plug of a head phone or ear phone (not shown) can be inserted into the jack 13 so that sound can be heard.

For example, if a speaker module having a front surface, a rear surface, a speaker, a speaker drive circuit, and appropriate connectors is operatively combined between the video image display module 2 and tuner module 3, the audio signal can be heard through the speaker. The front surface of the speaker module, of course, would have the engagement projections 39 and 40, the lock piece 45, and an appropriate connector. The rear surface thereof would have linkage portions 19 and 20, lock hole 24, and an appropriate connector in the same way as described above.

Figure 11:
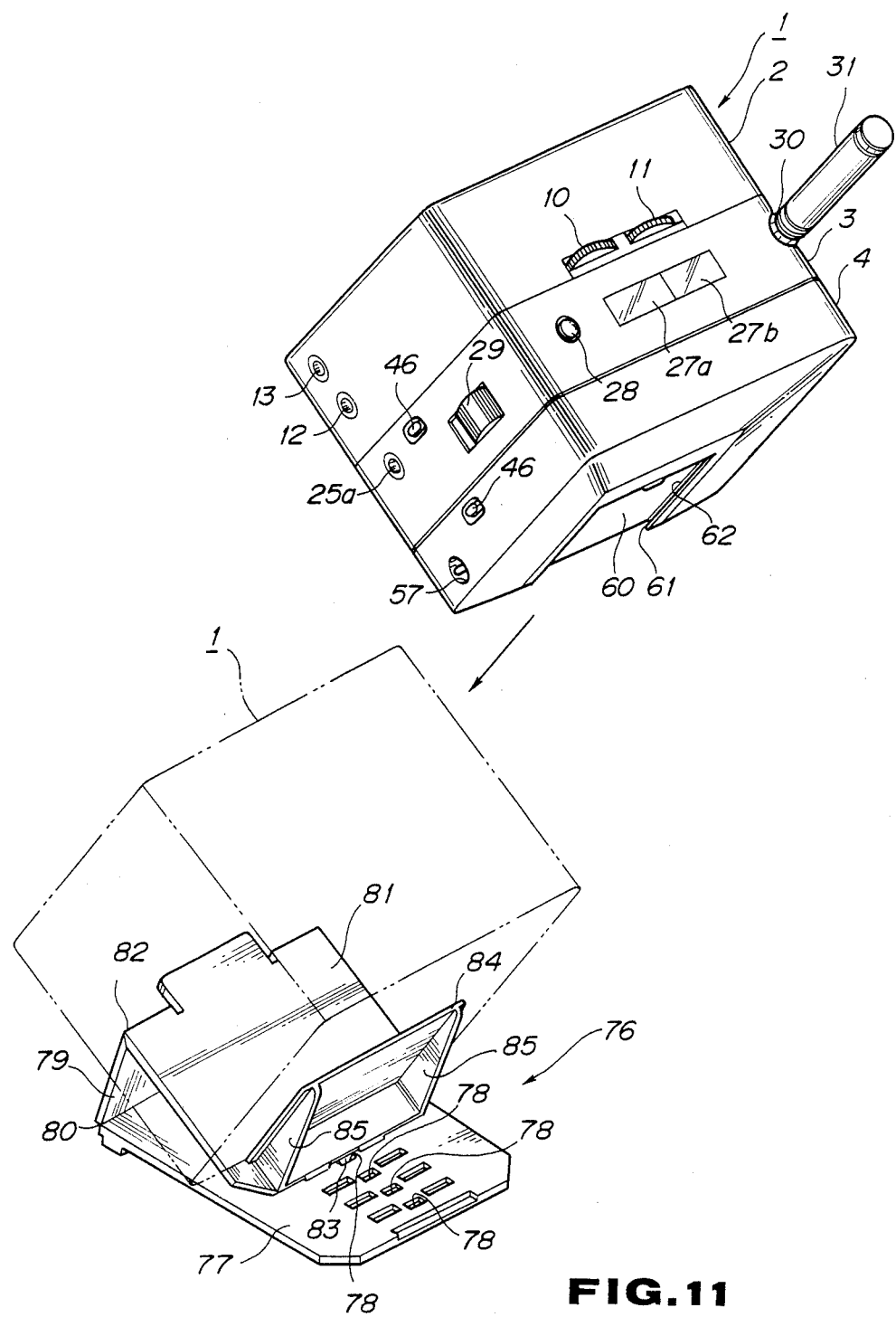
FIG. 11 is a perspective view illustrating mounting of the television monitoring apparatus on a stand.

In FIG. 11, a stand 76 is illustrated. The stand 76 is to mount the television monitoring apparatus 1 at an angle wherein the apparatus 1 is most easily viewed by a viewer when the television monitoring apparatus 1 is placed on, e.g., a desk table, etc.

The stand 76 has parts integrally formed of a synthetic resin the parts constituting a base 77, an intermediate piece 79, a mounting piece 81, and a linkage piece 84.

The base 77 is a substantially rectangular thin plate and is formed with engagement recesses 78. The recesses 78 extend from a substantially central portion to a rear end of the base 77.

The intermediate piece 79 has a width, as measured substantially in the vertical direction, about one-third of that of the base 77 and is linked to a front end of the base 77 via a thin hinge 80.

The mounting piece 81 has a horizontal width, as measured substantially along the length of the base 77, about two-thirds of that of the base 77 and is linked to an upper end edge of the intermediate piece 79 via a thin hinge 82. An engagement projection 83 is formed which projects downward from a trailing end edge of the mounting piece 81. An angle formed between the front surface of the linkage piece 84 and upper surface of the mounting piece 81 measures about 90 degrees. Reinforcement ribs 85 are formed along portions of the linkage piece 84 adjacent to both left and right side edges of a rear surface of the linkage piece 84. Lower ends of the ribs 85 are linked to the mounting piece 81.

The intermediate piece 79 of the stand 76 is slightly angled in the upward direction with respect to the base 77 while the mounting piece 81 is angled in the rearward direction with respect to the intermediate piece 79. The engagement projection 83 of the mounting piece 81 engages one of the engagement recesses 78 on the upper surface of the base 77 so that the mounting piece 81 is secured in an angled position with the intermediate piece 79 as a fulcrum. Then, if any one of the engagement recesses 78 is chosen to be used to engage the engagement projection 83, the inclined angle of the mounting piece 81 can be changed. That is to say, if the engagement projection 83 is engaged in one of the engagement recesses 78 which is located near the front end of the base 77, the inclined angle of the mounting piece 81 is greater and if the engagement projection 83 is engaged in one of the engagement recesses 78 which is located near the rear end of the base 77, the inclined angle is relatively lesser.

When both side edges of the linkage piece 84 engage the engagement grooves 62 formed on both sides of the shallow recess 60 formed on the rear surface of the power supply module 4, the television monitoring apparatus 1 can stably be supported on the stand 76.

Figure 6:
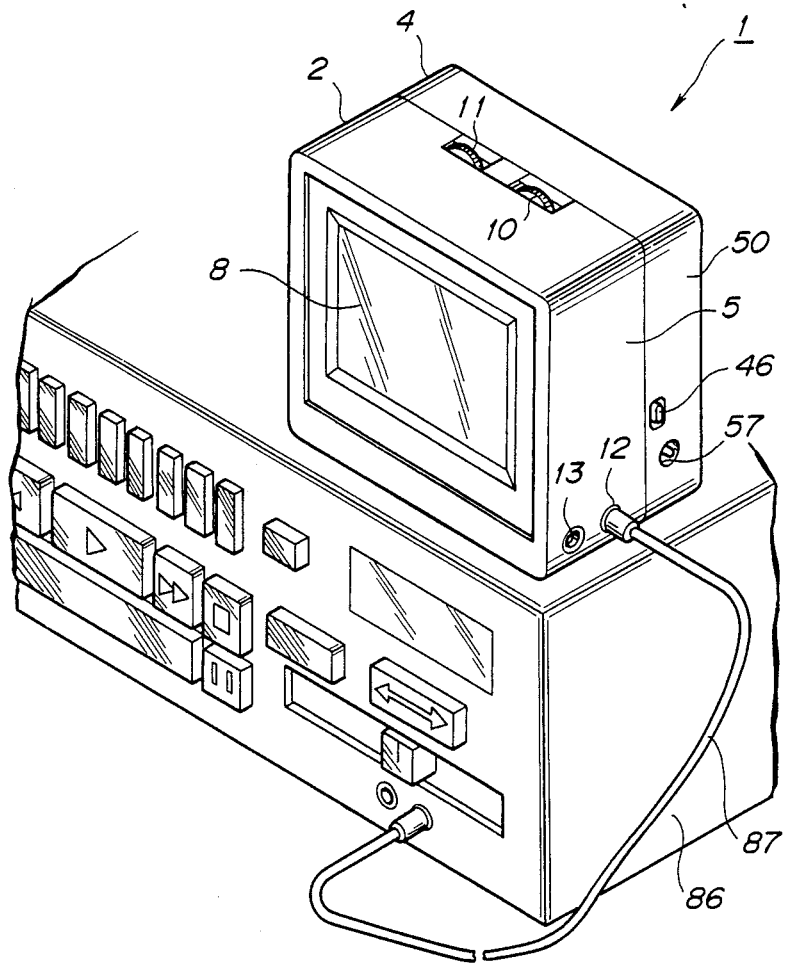
FIG. 6 is a perspective view of the television monitoring apparatus of FIG. 3 when used for monitoring a VTR.
Figure 7:
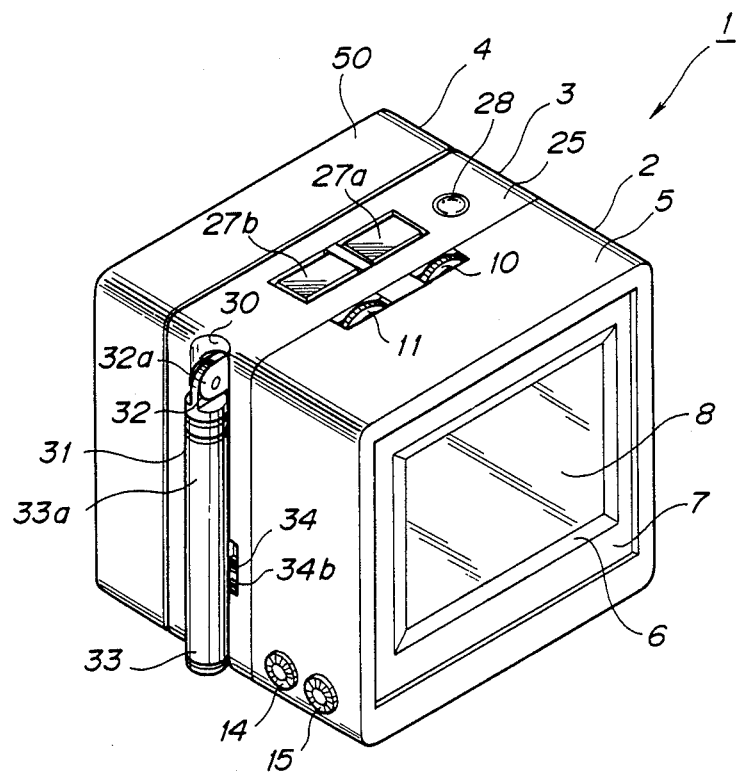
FIG. 7 is a perspective view of the television monitoring apparatus of FIG. 3 illustrating storage of the telescopic antenna.

With reference now to FIG. 6, it can be seen that when the television monitoring apparatus 1 is used as a monitoring apparatus for a VTR 86, or a video camera, laser disc player, or the like, no tuner module 3 is needed and the power supply module 4 is combined so as to mate with the rear surface of the video image display module 2. That is to say, the engagement projections 39 and 40 of the power supply module 4 are linked to the linkage portions 19 and 20 of the image display block 2.

It is noted that a speaker module, as described above, can be combined between the video image display module 2 and power supply module 4 whenever sound/voice is to be produced through a speaker.

As illustrated, a connection cord 87 is connected between the external video and/or audio output or the VTR 86 and the video and/or audio input jack 12 of the video image display module 2. As the video and/or audio signal is transmitted to the video image display module 2, switch means provided in the video image display module 2 is operated so that the power supply voltage is supplied from the power supply module 4 to the video and/or audio output circuit of the video image display module 2. Therefore, the video image display module 2 can serve as the television monitoring apparatus 1 for the VTR 86.

In order to separate each combined module, the depressible portion 46 of the rear side of each module is depressed so as to move the front end 45a of the lock piece 45 in the leftward direction, the lower end of the front end 45a of the lock piece 45 thereby being caused to deviate from the lock edge 24a of the lock hole 24 in the leftward direction. The rear side module is then moved in a downward direction relative to which it is attached.

Since the engagement between the engagement pieces 42 and cover pieces 22 is released, the engagement projections 39 and 40 of the rear side module can be drawn from the recess portions 21 of the front-side attached module.

A circuit for each module constituting the television apparatus 1 is described below. Primary reference should be made to FIGS. 12–16.

Figure 12:
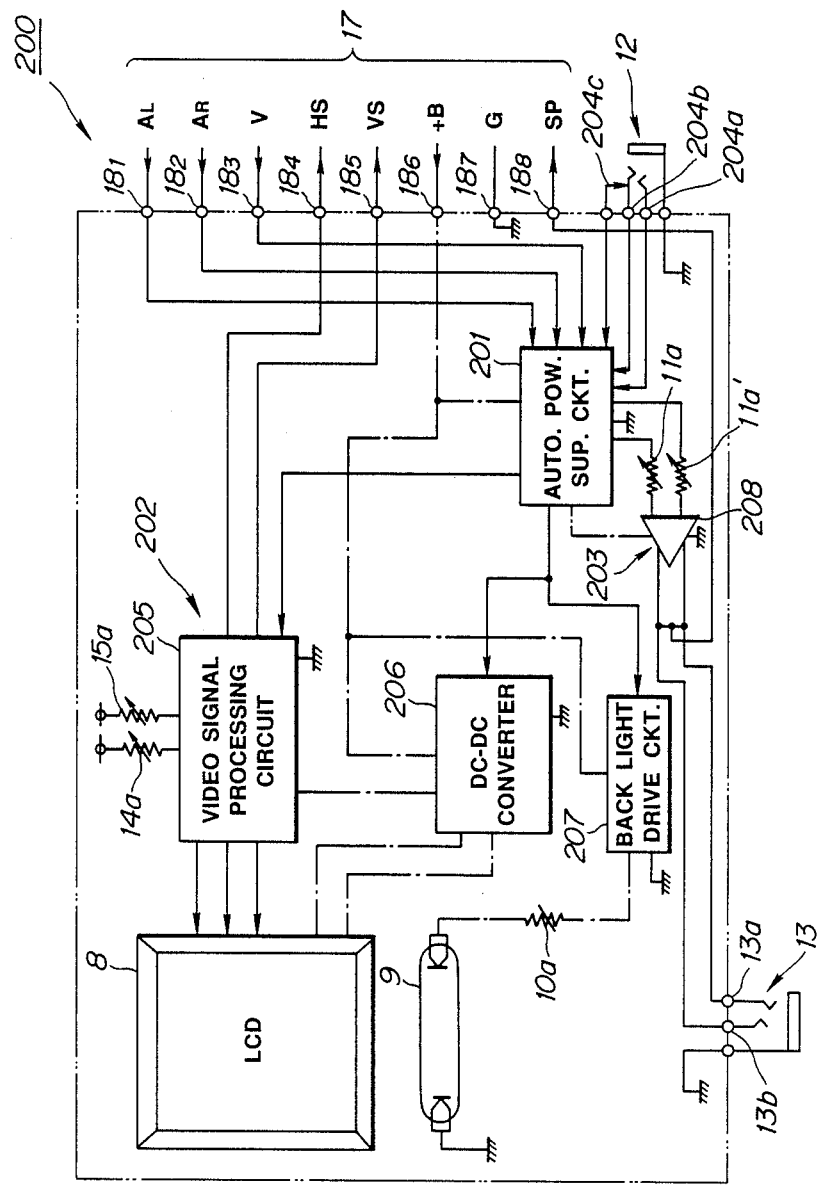
FIG. 12 is a circuit diagram of a video image display module circuit of the television monitoring apparatus embodying principles of the invention.

As illustrated in FIG. 12, a video display module circuit 200 receives as input a left (L) channel audio signal $A_L$ and a right (R) channel audio signal $A_R$, a video signal V, and a power supply voltage +B. The circuit 200 provides as outputs a horizontal synchronization pulse HS, a vertical synchronization pulse VS, a ground potential G, and a speaker output signal SP. The subscripts 1-8 in FIG. 12 associated with the pins 18 of the connector 17 indicate the various connector pins or contact terminals associated with the above-listed signals or voltages. For example, $18_1$ denotes an audio L channel terminal, $18_2$ denotes an audio R channel terminal, $18_3$ denotes a video terminal, $18_4$ denotes a horizontal synchronization pulse input terminal, $18_5$ denotes a vertical synchronization pulse input terminal, $18_6$ denotes a power supply terminal, $18_7$ denotes a ground terminal, and $18_8$ denotes a speaker terminal.

It can be appreciated that the matching terminals of the connectors of the various modules are denoted by the same subscripts. Accordingly, the same subscripts are associated with the same signal in each of the modules. Further, in the FIGS. 12–16, in order to more clearly distinguish between the signal lines, power supply lines, and ground lines, the signal lines are illustrated as solid lines, while the power supply lines and ground lines are illustrated as dot and dash lines, for example, as illustrated in FIG. 14.

As illustrated in FIG. 12, the video display module circuit 200 includes an automatic power supply circuit 201, a video signal processing circuit 202, and an audio signal processing circuit 203. The automatic power supply circuit 201 detects the presence or absence of the video signal and the audio signal transmitted through the connector 17 or through an external input terminal 204 of the audio/visual input jack 12 and the connection of the plug to the audio/visual input jack 12.

The supply of power to the video signal processing circuit 202 and the audio signal processing circuit 203 is controlled by means of the automatic power supply circuit 201. The automatic power supply circuit 201 serves as a prioritizing circuit so as to select for processing the signals $A_L$, $A_R$, or V received from the connector 17 (internal signals) or signals received from the external input terminal 204 (external signals). Priority is given to the external signals.

To this end, a plurality of input terminals of the automatic power supply circuit 201 are connected to the audio L channel 18, the audio R channel $18_2$, and the video terminal $18_3$ of the connector 17. Other input terminals are connected to a video terminal 204a, an audio terminal 204b, and a plug-in detection contact 204c, of the external input terminal 204 of the input jack 12. A power input is coupled to the power supply terminal $18_6$.

Additionally, output terminals of the automatic power supply circuit 201 are connected to a power supply portion of the video signal processing circuit 202 and a power supply portion of the audio signal processing circuit 203. The power supply to these processing circuits is controlled and selectively provided depending on the input of signals to the automatic power supply circuit 201.

Figure 13:
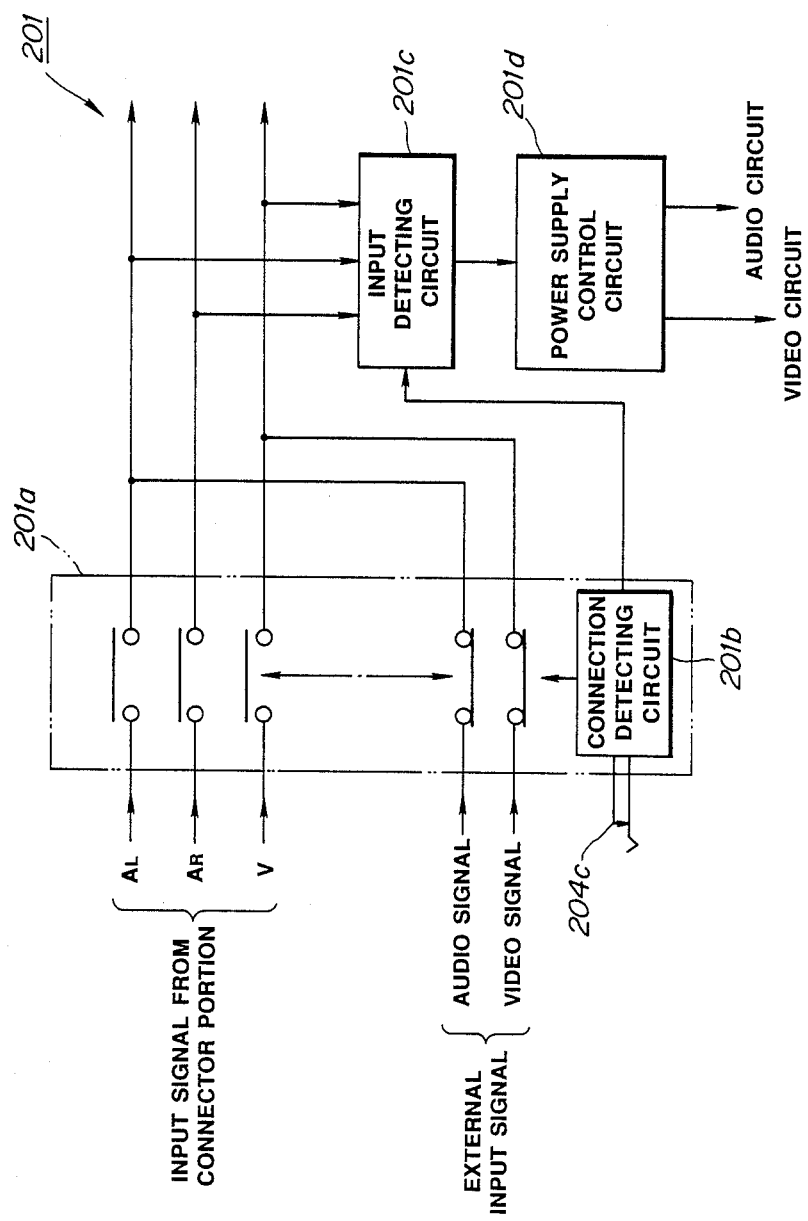
FIG. 13 is a circuit diagram of an automatic power supply circuit of the television monitoring apparatus of FIG. 12 according to principles of the invention.
Figure 14:
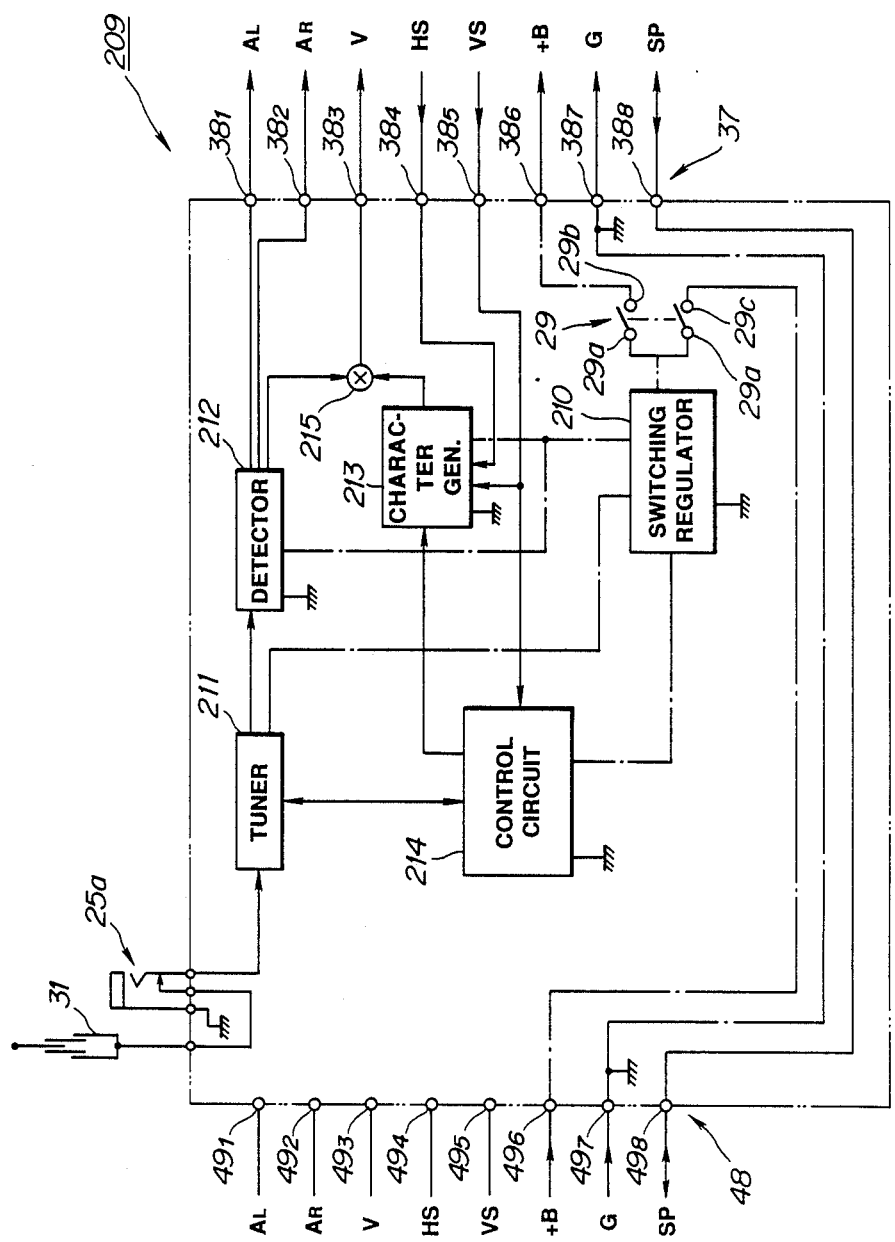
FIG. 14 is a circuit diagram of a television tuner module of the television monitoring apparatus of the present invention.

The automatic power supply circuit 201 is illustrated in more detail in FIG. 13. Thus, it can be seen that an input selection circuit 201a is provided for selecting an external signal from the terminal 204 while inhibiting input of internal signals from the connector 17. This selection is caused by the detection of the insertion of a plug into the jack 12 by means of the contact 204c and a connection detection circuit 201b.

An input detecting circuit 201c is provided for detecting the presence of an external audio signal. When an external audio signal is detected, a predetermined DC voltage is applied to an audio signal input terminal of the input detecting circuit 201c. When an external video signal is detected, an AC signal is rectified into a DC signal by the input detecting circuit 201c and supplied to the power supply control circuit 201d.

A power supply control circuit 201d is provided for controlling the supply of electrical power to the video signal processing circuit 202 and the audio signal processing circuit 203 in accordance with the signal received from the input detecting circuit 201c. For example, when an external signal is provided via the input jack 12, the external audio signal is detected and power is supplied to the audio signal processing circuit 203. In contrast, when an internal audio L channel $A_L$ is provided via the connector 17, and no plug is detected in the input jack 12, power is supplied to both the audio signal processing circuit 203 and the video signal processing circuit 202. However, when only an audio R channel signal $A_R$ is detected, power is supplied only to the audio signal processing circuit 203.

In the following table, the above-described operations and results are listed. A "Yes" in a column denotes that power is supplied, while a "No" denotes that power is not supplied to one of the audio or video signal processing circuits 203 or 202, respectively. A "NA" denotes that this operation/result is not applicable because the referenced input signal is not detected.

| Detected Input Signal | Processing Circuit to Which Power is Applied | |
|---|---|---|
| | Video Signal Processing Circuit 202 | Audio Signal Processing Circuit 203 |
| External Input Signal from Jack 12 | | |
| Audio Signal | No | Yes |
| Video Signal | Yes | Yes |
| Internal Input Signal from Connector 17 | | |
| $A_L$ Signal | Yes | Yes |
| $A_R$ Signal | No | Yes |
| V Signal | NA | NA |

By selectively applying power to the signal processing circuits 202 and 203 as set forth above, power consumption can be reduced and thus, wasteful consumption avoided. Further, a power application switch to selectively switch on power to the video display module 2 can be omitted.

As further illustrated in FIG. 12, the video signal processing circuit 202 is coupled to the LCD display 8. The signal processing circuit 202 includes a signal processing circuit 205 for providing video image signals to the display 8. The circuit 205 processes the video input signals and then supplies the processed image signals to the display 8. A DC-DC converter 206 supplies power to the LCD display 8 and to the circuit 205. A backlighting light source drive circuit 207 provides controlled power to the backlighting light source 9 for controlled illumination of same.

The signal processing circuit 205 includes input terminals coupled to a video signal output terminal of the automatic power supply circuit 201, a variable resistor 14a is coupled to another terminal of the circuit 205 for adjusting the contrast of the image displayed on the display 8. Another variable resistor is similarly provided for adjusting the color of the displayed image.

The circuit 205 processes the internal video signals from the tuner module 3 or the external video signals from a unit such as the VTR 86, and then provides each color signal to the display 8. At the same time, the circuit 205 provides the horizontal and vertical synchronization pulses at the appropriate terminals of the connector 17.

The DC-DC converter 206 is coupled to the power supply terminal $18_6$ and provides various levels of bias voltages from the DC voltage from the power supply module 4. As discussed above, the converter 206 provides power to the circuit 205 and the display 8 in accordance with selection inputs provided by the automatic power supply 201.

The backlighting light source drive circuit 207 is also coupled to the power supply terminal $18_6$, and is coupled to one terminal of the backlighting light 9 via a variable resistor 10a. The resistor 10a is provided for adjusting brightness of the image displayed on the display 8. It can be appreciated that because the presence or absence of a displayed image is determined by the automatic power supply circuit 201, when the audio and video signals are intermittently supplied to the video display module 2, the backlighting light source 9 is similarly intermittently turned on and off. Because the intermittent turning on and off of the light source 9 reduces the life of same, a capacitor/resistor circuit having a predetermined time constant is provided within the automatic power supply circuit 201 so reduces the frequency of such turning on and off.

The audio signal processing circuit 203 includes variable resistors 11a and 11a' for adjusting volume. The resistors 11a and 11a' are coupled between the power supply circuit 201 and a power amplifier 208 of the circuit 203.

The power amplifier 208 has an additional power supply terminal coupled to the automatic power supply circuit 201 and output terminals coupled to terminals 13a and 13b of the earphone jack 13 and speaker terminal $18_8$ of the connector 17. As illustrated, when an earphone plug is inserted into the jack 13, the output signals of the power amplifier 208 are not provided to the terminal $18_8$.

The operation of the video display module 2 will now be more particularly described.

When an audio signal and a video signal are provided to the video display module 22 via the connector 17, these signals are detected by the automatic power supply circuit 201 and the DC-DC connector 206 is caused to supply power to the video signal processing circuit 205, the display 8, the backlighting light source 9, and the power amplifier 208. Thus, the video and audio signals are supplied to the video processing circuit 205 and power amplifier 208, respectively. Images are displayed on the LCD display 8 while an audio signal is supplied to the earphone jack 13 and for the speaker terminal $18_8$ (depending on whether an earphone is plugged into the jack 13). If only an audio R channel signal $A_R$ is supplied via the connector 17, power is supplied only to the power amplifier 208 and not to the circuit 205.

When a plug associated with the VTR 86 is inserted into the A/V jack 12 and a signal is supplied therethrough, the automatic power supply circuit 201 inhibits the input reception of the internal signals $A_L$, $A_R$, and V via the connector 17. Instead, the external signals are supplied to the processing circuits 202 and 203.

A description of the tuner module circuit 209 now follows. Primary reference should be made to FIG. 14.

The tuner module circuit 209 generally includes a switching regulator 210, a tuner 211, a detector 212, a character generator 213, a control circuit 214, and a mixer 215. These components are operatively coupled between the two connectors 37 and 48, having connector pins 38i and 49i, respectively. The connectors serve to electrically couple the tuner module 3 between the video display module 2 and the power supply module 4.

The switching regulator 210 is employed to produce a predetermined power supply voltage from another power supply, which in this embodiment, is the power supply module 4.

An input terminal of the regulator 210 is connected to common contacts 29a of a power switch 29. Other contacts 29b and 29c are connected to power supply terminals $38_6$ and $49_6$, respectively. When the switch 29 is switched to the "on" position, power supplied at the terminal $49_6$ is supplied to the regulator 210 and the terminal $38_6$ of the connector 37. Power is then supplied to each of the circuits 211, 212, 213, and 214 via the regulator 210.

As illustrated, terminals $49_1$ to $49_5$ are dummy terminals to which no tuner module circuitry is connected. Further, ground terminals $49_7$ and $38_7$ are directly connected to each other as are speaker signal terminals $49_8$ and $38_8$.

The tuner circuit 211 is a circuit designed for converting a radio frequency (RF) signal received via the telescopic antenna 31 or an external antenna (coupled to the tuner module 3 via the antenna jack 25) into an intermediate frequency (IF) signal. The IF signal is then supplied to the detector 212. It can be appreciated that the tuner circuit 211 is controlled by the means of the control circuit 214.

The detector 212 separates the audio and video signals from the IF signal and then supplies these separated signals to other circuits. The video signal is supplied to the mixer 215. The audio signals are supplied to the audio signal terminals $38$, $_{and}$ $38_2$ as the internal audio signals $A_L$ and $A_R$, respectively.

The character generator 213 has inputs coupled to the horizontal synchronization pulse terminal $38_4$ and the vertical synchronization pulse terminal $38_5$ as well as an input coupled to the control circuit 214. The character generator 213 generates a character signal representing a selected television channel upon receipt of a signal from the control circuit 214 commanding the character generator 213 to do so. The character signal is supplied to the mixer 215 and mixed with the video signal as to cause the display of a character representative of a selected television channel on the display 8. To this end, the mixed video/character signal is supplied to the video signal V terminal $38_3$.

When a vertical synchronization pulse is coupled to the input terminal of the control circuit 214, the control circuit 214 processes the input signals from the tuner circuit 211 as well as the channel selection switch 27a (not illustrated in FIG. 14) to control the tuner circuit 211 as well as the character generator 213.

Figure 15:
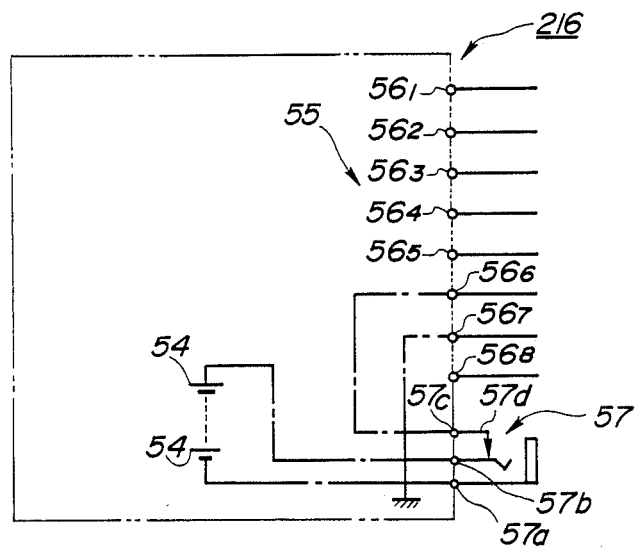
FIG. 15 is a circuit diagram of the power supply module of the monitoring apparatus of the present invention.

In FIG. 15, it is illustrated that positive and negative poles of the serially connected dry cells 54 of the power supply circuit 216 of the power supply module 4 are connected to two terminals 57a and 57b, respectively, of the three terminals of the power supply input jack 57. Terminal 57c is coupled to terminal 57b via an abutting contact between a contact extending from terminal 57b and a detecting contact 57d extending from terminal 57c. Terminal 57c is also coupled to a power supply terminal $56_6$ of the connector 55.

It can be appreciated that when the connector plug 59 of the AC adaptor 58 is not connected to the power supply input jack 57, the terminal voltage of the dry cell 54 is applied to the power supply terminal $56_6$ of the connector 55. However, when the plug 59 is inserted into the jack 57, the contact 57d is disassociated from the contact extending from the terminal 57b so that the contact therebetween is opened and power supplied by the AC adaptor 58 is supplied to the power supply terminal $56_6$ instead.

As illustrated, terminals $56_1$ to $56_5$ are presently not utilized.

It can be appreciated that the construction of the circuitry of the rechargeable-type power supply module 4B is similar to that of circuit 216 except for the use of a rechargeable battery in the place of the dry cells 54. Accordingly, no further description is provided herein.

Figure 16:
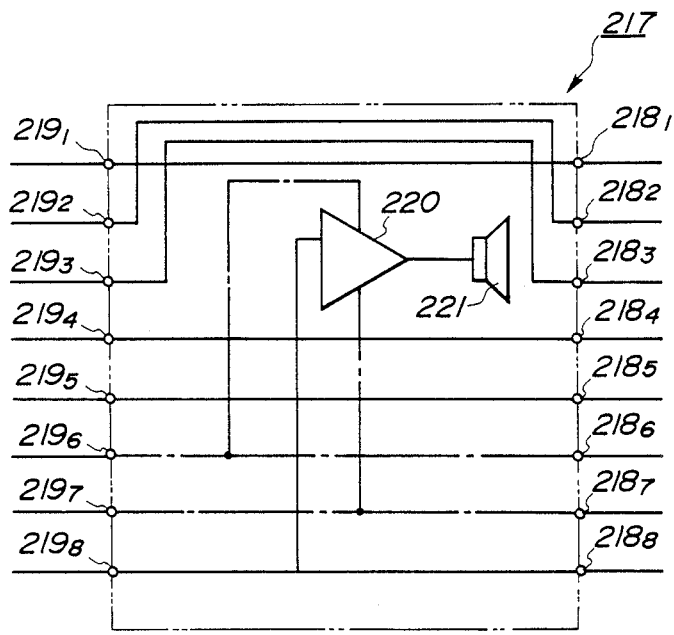
FIG. 16 is a circuit diagram of a speaker module of the television monitoring apparatus of the present invention.
Figure 19:
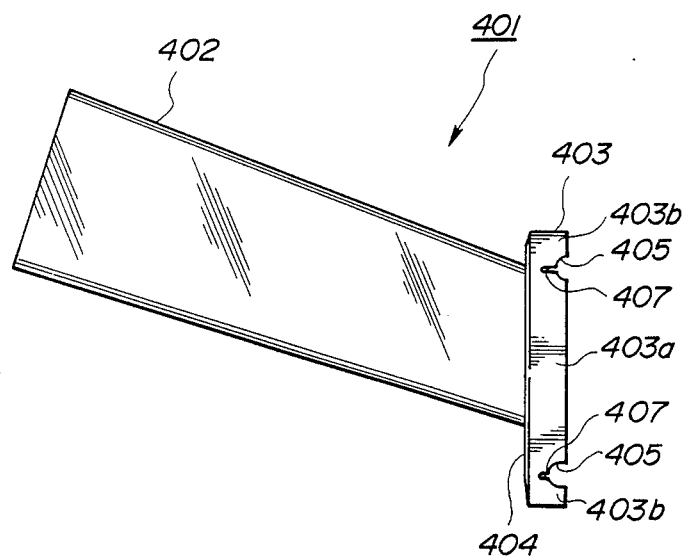
FIG. 19 is a side view of the hood illustrated in FIG. 17.
Figure 20:
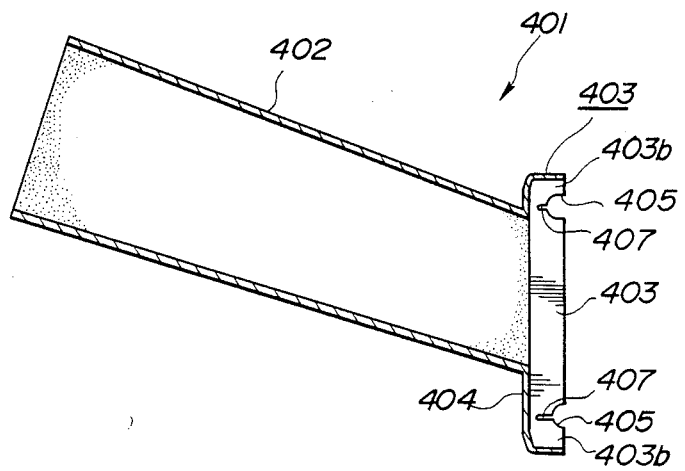
FIG. 20 is a cross-sectional view of the hood illustrated in FIG. 17 taken along the lines IV—IV in FIG. 18.
Figure 21:
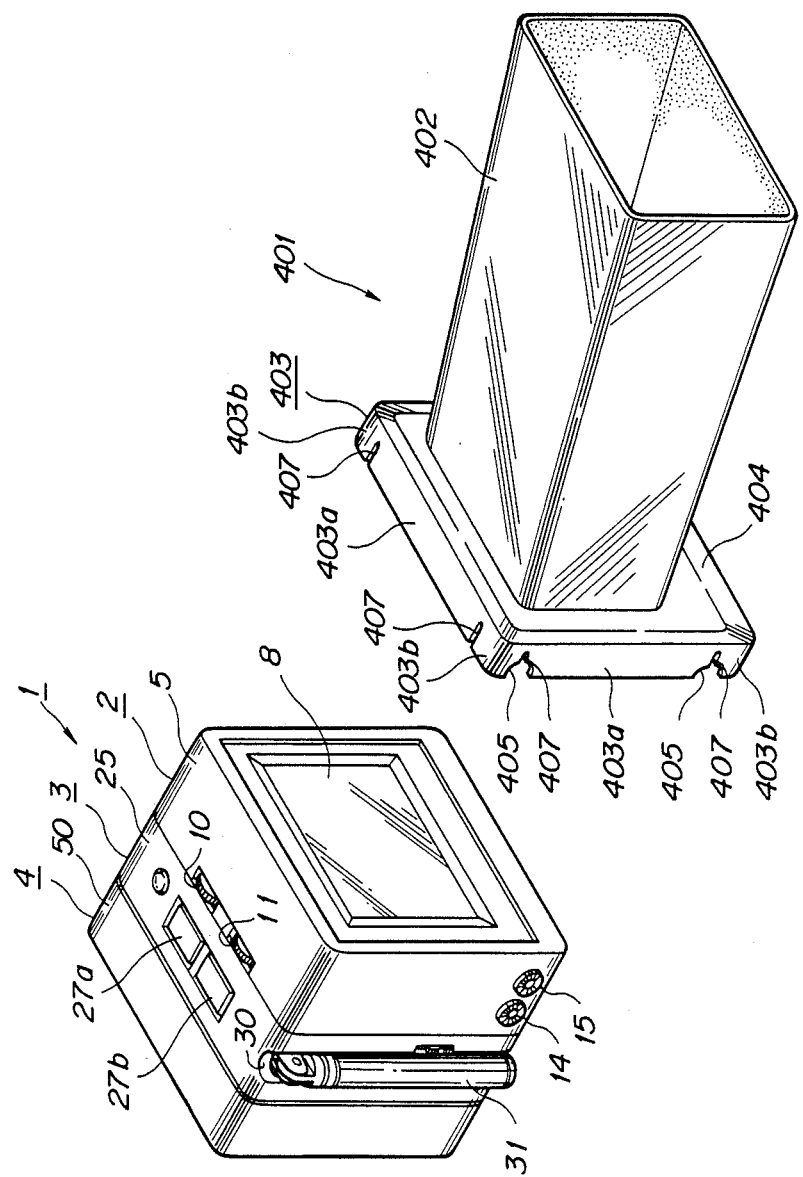
FIG. 21 is a perspective view of the hood illustrated in FIG. 17.
Figure 22:
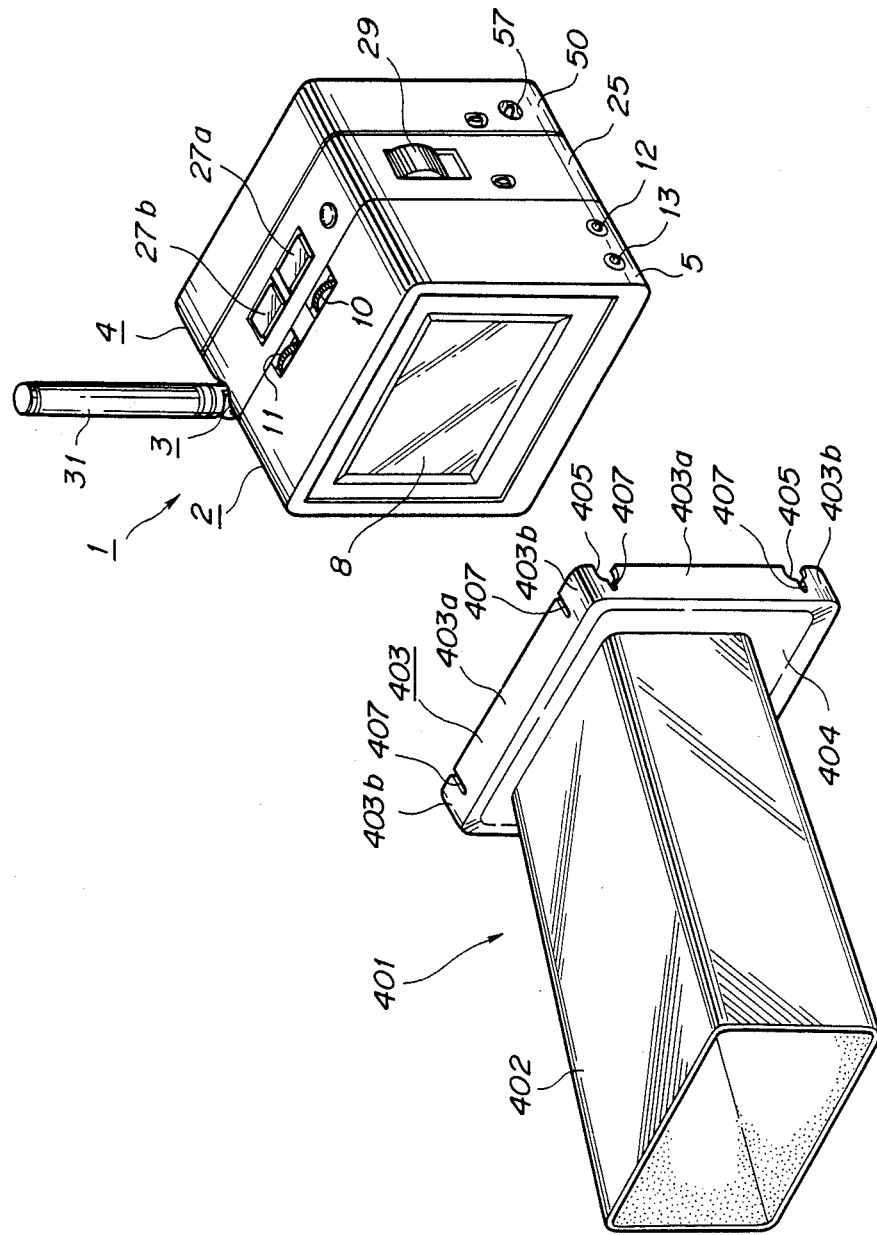
FIG. 22 is another perspective view of the hood illustrated in FIG. 17.

In FIG. 16, there is illustrated a circuit 217 of a speaker module. The speaker module circuit 217 includes a connector 218 having terminals $218_1$ to $218_8$ and a connector 219 having terminals $219_1$ to $219_8$. It can be appreciated that the connectors 218 and 219 are located on opposite sides of the speaker module so as to operatively contact the connectors associated with the video display module 2 and/or the tuner module 3. Further, each terminal $218i$ is coupled directly to its corresponding terminal $219i$.

To provide proper amplified sound, a power amplifier 220 and a speaker 221 are included in the speaker module. A positive power supply input terminal of the amplifier 220 is coupled to the power supply terminals $218_6$ and $219_6$. A negative (ground) terminal is coupled to terminals $218_7$ and $219_7$. The input terminal of the amplifier 220 is coupled to the speaker signal terminals $218_8$ and $219_8$. The output of the amplifier is coupled to the speaker 221.

Accordingly, when power is supplied to the terminals $218_6$ and $219_6$, the speaker signal S is amplified by the amplifier 220 and then supplied to the speaker 221 which emits an appropriate sound signal.

A hood 401 embodying principles of the invention and adapted to be attached to the front of the video display module 2 is illustrated in FIGS. 17–23. A description of the hood 401 follows.

The hood 401 includes a cylindrical hood body 402 having a rectangular cross-sectional shape. The width and height of the hood body 402 increases in a direction proceeding from an end that attaches to the video display module 2 to a front end thereof. The hood 401 includes a frame body 403 having a flat rectangular box-shape into which an outer frame of the video display module 2 and a front surface plate 404 that attaches to the front of the video display module 2. A front surface plate 404 of the frame 403 extends from the rear edge of the hood body 402.

It can be appreciated that the inner shape of the frame body 403 is substantially similar to that of the outer shape of the video display module 2. A rear end portion of the hood body 402 is positioned on the front surface plate 404 in a vertically offset position. Moreover, the hood body 402 extends from the plate 404 at an angle of inclination.

An inner wall surface of the hood body 402 is coated with a matt paint so that the image screen of the video display module 2 does not reflect onto the inner wall surface when one views the display 8 through the hood body 402.

Semicircular recesses 405 are formed with slits at rear portions thereof and are provided on upper and lower portions of the lateral sides 403a of the frame 403. The recesses 405 are installed so as to correspond to switches and terminals disposed along the left and right side surfaces of the video display module 2.

Figure 23:
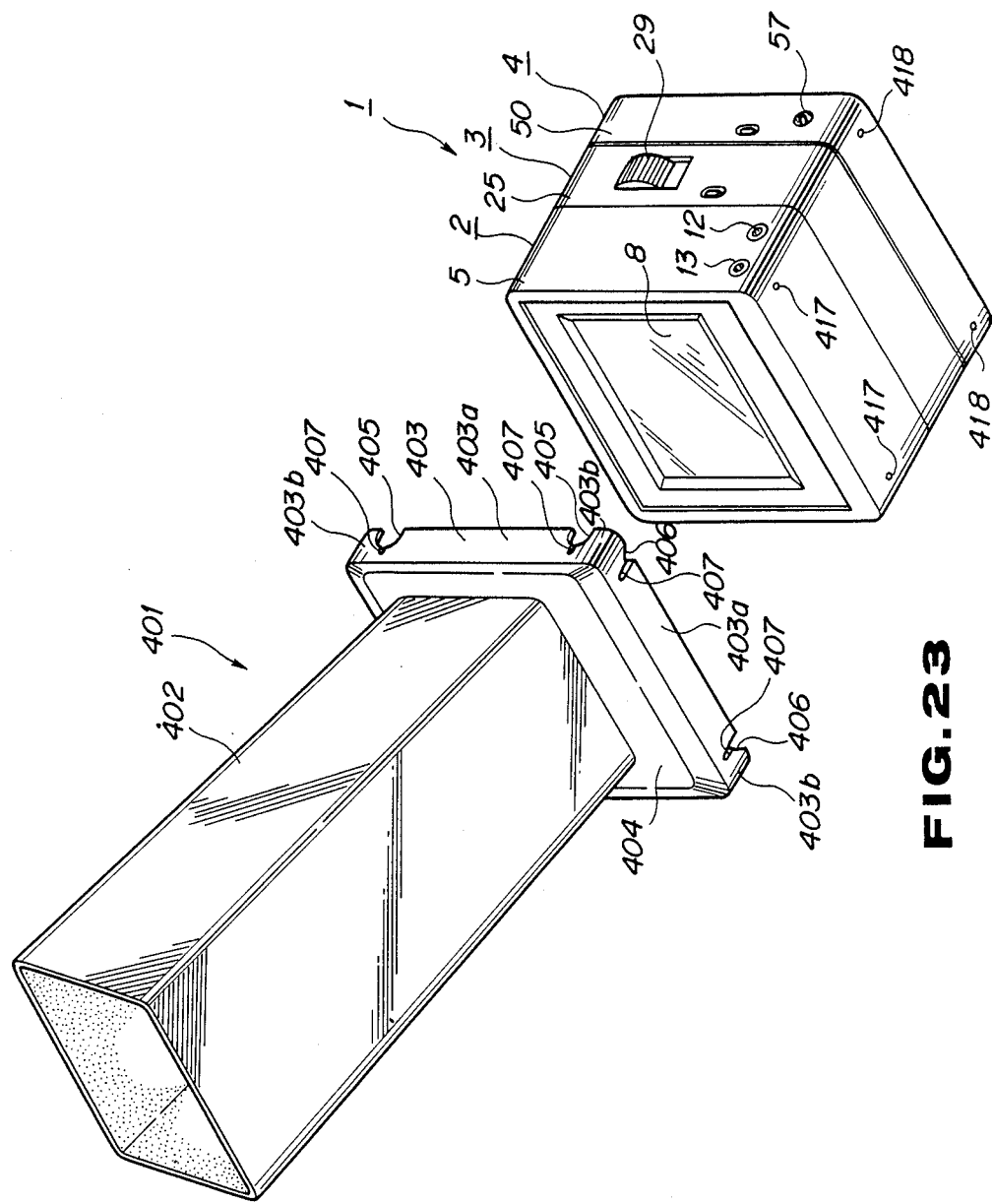
FIG. 23 is another perspective view of the hood illustrated in FIG. 17.

As illustrated in FIG. 23, triangular-shaped recesses 406 having slits 407 at inner ends near corners 403b, are disposed at positions along the lower frame piece 403a of the frame body 403 that deviate toward the left and right side ends. The recesses 406 are disposed at positions corresponding to minor projections 417 at the front side at corners of a lower surface of the video display module 2. The shapes of the slits 407 provide flexibility of the frame sides 403a and are formed so as to engage the respective corners 403b.

The projections 417 are formed integrally on positions of the lower surface of the outer frame of the video display module 2 adjacent to corners of the lower surface thereof. The projections 417 serve as a base portion together with the minor projections 418 formed on the lower surface of the power supply module 4, when the modules 2, 3, and/or 4 are combined together.

The hood 401 is mounted on the video display module by placing the frame 403 about the front surface of the video display module 2 until the front surface of the video display module 2 comes into contact with an inner surface of the front surface plate 404. At this time, since each frame side 403a of the frame body 403, and each corner 403b is flexed in an outer direction and to the presence of the slits 407 and recesses 405, the frame 403 can be adjusted so as to snugly fit on the video display module 2. It can be appreciated that the frame body 403 is secured onto the front end portion of the outer frame 5 of the video display module by a suitable frictional engagement force. Since the recesses 405 and 406 are formed at positions along the sides 403a corresponding to the adjusting dials 14 and 15 and jacks 13 and 12, these dials and jacks will not be overlaid by the frame body 403 when the hood is mounted on the video image display module 2. Accordingly, the operation or functions thereof will not be impeded.

Figure 24:
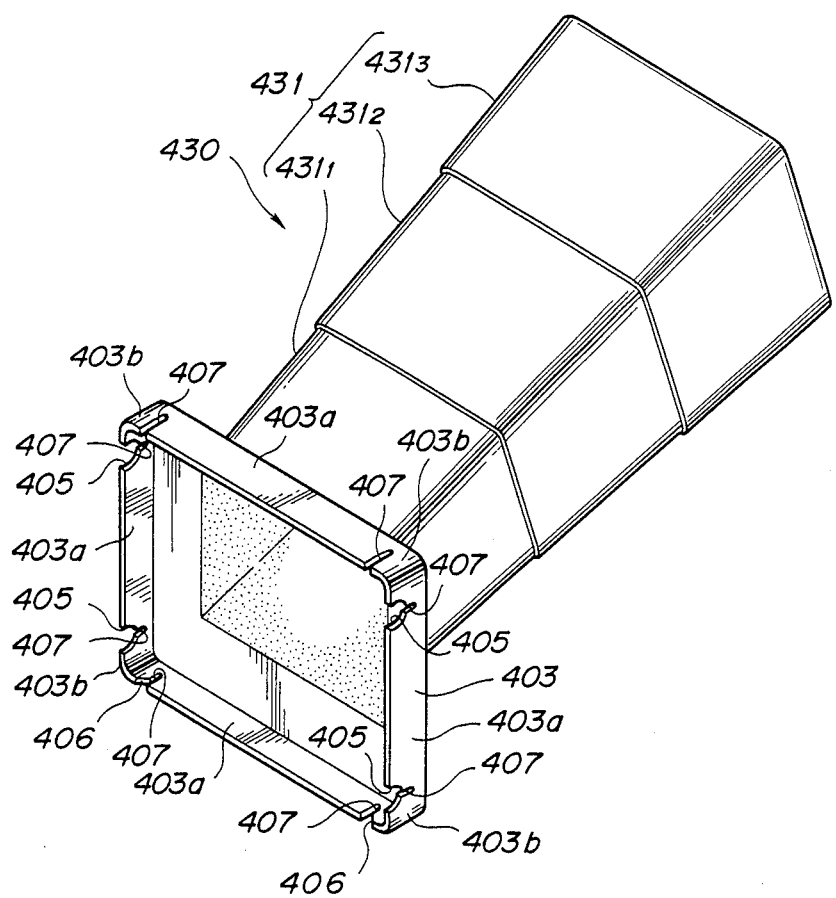
FIG. 24 is a perspective view of a hood of a second preferred embodiment of a television monitoring apparatus embodying principles of the invention.
Figure 25:
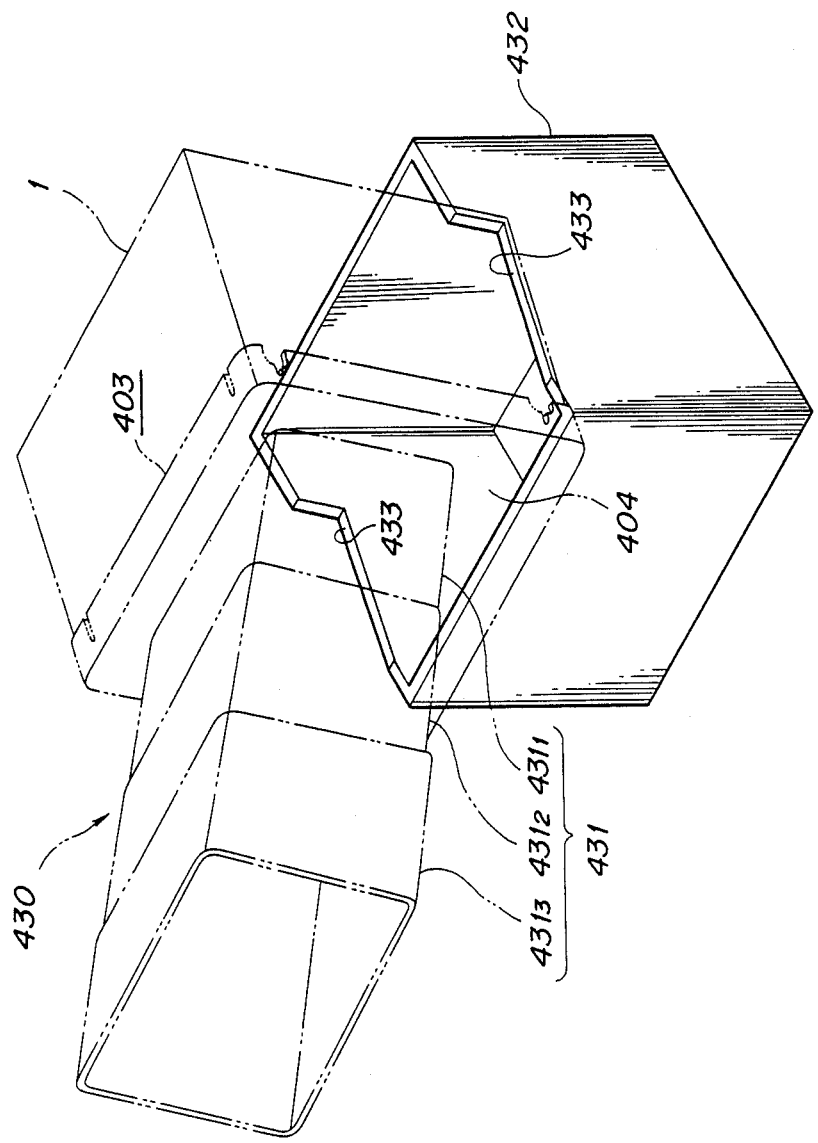
FIG. 25 is a perspective view of a television monitoring apparatus embodying principles of the invention including the hood illustrated in FIG. 24, the television monitoring apparatus being mounted on a stand.
Figure 26:
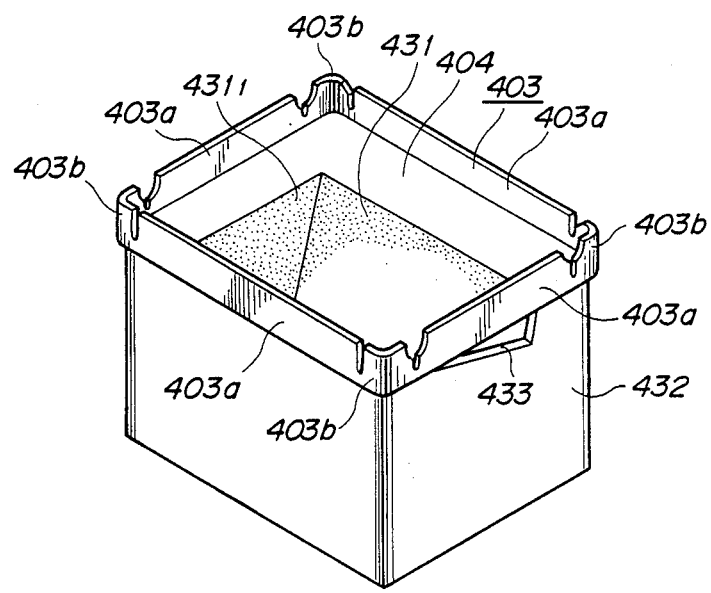
FIG. 26 is a perspective view of the hood illustrated in FIG. 24 when the hood is stored in the stand illustrated in FIG. 25.

A second embodiment of a hood embodying principles of the invention adapted to be attached to the video display module 2 is illustrated in FIGS. 24–26. A description of this second hood follows.

At the outset, it should be noted that the only difference between this second embodiment and the first embodiment 401, is that the hood body 430 includes a plurality of separate members coupled together in telescopic fashion, identical reference numerals are employed to designate correspondingly identical elements in the first and second embodiments 401 and 430. Accordingly, a detailed explanation of these previously described elements is omitted here.

As illustrated, the hood member 430 includes a frame body 403 to which is connected a hood body 431. The hood body 431 comprises a plurality of telescopic hood body elements $431_1$, $431_2$, and $431_3$. These hood body elements are operatively coupled together so as to form the telescopic hood body 431 which extends in a frontward direction from the frame body 403 at an angle of inclination with respect to the plane defined by the front surface 404 of the frame body 403.

It can be appreciated that the frame body 430 is rectangular in cross-section. As one proceeds from the frame body 403 to an outer edge of the hood body 430, the height and width of the rectangular cross-section increase. A base end of the hood body element $431_1$ is integrally formed with the front surface plate 404. The second hood body element $431_2$ engages about the first hood body element $431_1$, inasmuch as the cross-sectional area thereof is larger. The third hood body element $431_3$ similarly engages the second hood body element $431_2$ It can be appreciated that the hood body elements $431_2$ and $431_3$ are formed so as to be slidable with respect to each other and, in turn, with respect to the hood body element $431_1$. When the hood body elements $431_2$ and $431_3$ are caused to slide in an outward direction with respect to the first hood element $321_1$, inner peripheral walls at bases of the elements engage outwardly extending outer peripheral walls formed at the outer end of the respective inner hood body elements $431_1$ or $431_2$. When the hood body elements $431_i$ are caused to be slid in the opposite direction, the hood body 430 collapses into a compact structure.

It is illustrated most clearly in FIGS. 25 and 26, the second hood embodiment includes a stand 432 specially designed to accommodate storage of the hood 430 and optionally to support the television apparatus 1 thereon. The stand 432 comprises substantially a rectangular box-shape with an open upper face. It can be appreciated that the interior of the stand 432 is appropriately dimensioned so as to accommodate therein the third hood body element $431_3$.

An upper periphery of the open face of the stand 432 includes triangularly shaped indentations 433 that are adapted for mounting of the television apparatus 1 thereon. As is illustrated most clearly in FIG. 25, the television apparatus 1 is supported on the indentations 433 so as to be positioned at a slight angle of incline.

While a preferred embodiment has been shown, modifications and changes may become apparent to those skilled in the art which shall fall within the spirit and scope of the invention. It is intended that such modifications and changes be covered by the attached claims.

We claim:
1. A television, comprising:
   (a) a power supply module;
   (b) a video display module having first switching means for detecting an input signal and for controlling supply of power from said power supply module to a signal output circuit; and
   (c) a tuner module having second switching means for controlling supply of power from said power supply module to said video display module.
2. The television of claim 1, wherein:
   (a) said first switching means controls the supply of power voltage to said signal output circuit when said video display module is attached to said power supply module; and
   (b) said second switching means controls the supply of power to said video display module when said tuner module is attached between said video display module and said power supply module.
3. The television of claim 1, wherein said tuner module is a tuner for television broadcasts.
4. The television of claim 3, wherein said tuner module comprises:
   (a) a telescopic antenna;
   (b) a casing having a side face with an elongated recess adapted to receive said antenna; and
   (c) a switch portion located with said recess.
5. A television apparatus, comprising:
   (a) a first module for supplying a bias voltage;
   (b) a second module for receiving video and audio signals, for controlling the supply of voltage to a circuit in accordance with receipt of the video and audio signals, for displaying an image on a screen in response to receipt of a video signal, and for providing an audio signal output; and
   (c) a third module for processing and transmitting the video and audio signals to the second module and for controlling supply of the bias voltage to the second;
   the module being removably securable to each other such that the first and second modules can be operatively secured together or the third module can optionally be operatively secured between the first and second modules.
6. A modular television apparatus, comprising:
   (a) a video display module;
   (b) a power supply module;
   (c) means for releasably securing said power supply module to said video display module; and
   (d) means for electrically coupling said power supply module to said video display module when said modules are secured together.
7. The modular television apparatus of claim 6, further comprising:
   (a) a tuner module;
   (b) means for releasably securing said tuner module between said video display module and said power supply module, said means including means for releasably securing one side of said tuner module to said video display module and means for releasably securing another side of said tuner module to said power supply module;
   (c) means for electrically coupling said tuner module to said video display module; and
   (d) means for electrically coupling said tuner module to said power supply module.
8. The modular television apparatus of claim 6, wherein the tuner module comprises a side panel from which a pivoting antenna extends; a longitudinal recess that extends along the side panel, the recess accommodating therein the antenna during storage of same; and sliding control knobs that conform to the shape of the recess and which conform about the antenna when the antenna is stored within the recess.
9. The modular television apparatus of claim 6, wherein each module comprises a substantially rectangular box-shaped case, the video display module having a front screen side and a back attaching side, the tuner module having a front side adapted to attach to the video display module and a back side adapted to attach to the power supply module, and the power supply module has a front side adapted to attach to the tuner module.
10. A modular television monitor, comprising:
   (a) a video display module;
   (b) a tuner module;
   (c) a power supply module;
   (d) means for releasably securing the video display module to another module;
   (e) means for releasably securing the tuner module to another module;
   (f) means for releasably securing the power supply module to another module;
   (g) means for electrically coupling the video display module to another module;
   (h) means for electrically coupling the tuner module to another module; and
   (i) means for electrically coupling the power supply module to another module;
whereby, the modules can be interchanged so that the video display module can be attached to the power supply module to form a video monitor, or the tuner module can be attached between the video display mod- ule and the power supply module to form a television set.

11. The television of claim 1, further comprising:
a hood having a frame member adapted to engage a front surface of said video display module and an elongated hollow hood body that extends from said frame member, the frame member including an appropriate opening so that one can view the video display module through the hood body.

12. The television of claim 11, wherein said frame member comprises lateral sides with openings in the edges of the sides, said opening registering with the switches or terminals located on said video display module.

13. The television of claim 11, wherein said hood body comprises a plurality of hood bodies that operatively couple together in telescopic fashion.

* * * * *